United States Patent [19]

Nagai et al.

[11] Patent Number: 5,576,608
[45] Date of Patent: Nov. 19, 1996

[54] METHOD FOR CHARGING SECONDARY BATTERY AND CHARGER USED THEREFOR

[75] Inventors: Tamimi Nagai, Kanagawa; Hitoshi Akiho, Miyagi, both of Japan

[73] Assignee: Sony Corporation, Tokyo, Japan

[21] Appl. No.: 237,299

[22] Filed: May 3, 1994

[30] Foreign Application Priority Data

May 14, 1993 [JP] Japan ................................. 5-112639
May 18, 1993 [JP] Japan ................................. 5-155783

[51] Int. Cl.$^6$ .................................................. H01M 10/44
[52] U.S. Cl. .................................................. 320/22; 320/31
[58] Field of Search .................................. 320/19, 20, 30, 320/31

[56] References Cited

U.S. PATENT DOCUMENTS

| | | | |
|---|---|---|---|
| 3,854,082 | 12/1974 | Nasby et al. ............................ | 320/22 |
| 4,607,208 | 8/1986 | Vreeland ................................. | 320/21 |
| 4,609,861 | 9/1986 | Inaniwa et al. ......................... | 320/32 |
| 4,661,760 | 4/1987 | Goto et al. .............................. | 322/27 |
| 4,680,528 | 7/1987 | Mikami et al. ......................... | 320/30 |
| 4,843,299 | 6/1989 | Hutchings .............................. | 320/31 |
| 5,172,044 | 12/1992 | Sasaki et al. ........................... | 320/22 |
| 5,175,485 | 12/1992 | Joo ......................................... | 320/32 |

*Primary Examiner*—Peter S. Wong
*Assistant Examiner*—Gregory J. Toatley
*Attorney, Agent, or Firm*—Jay H. Maioli

[57] ABSTRACT

A secondary battery charging method and a charger used therefor, in which the method uses a constant current and a constant voltage such that the secondary battery is first charged with the constant current until the terminal voltage of the battery becomes a reference voltage higher than the full charging voltage for the battery and then further charged with the constant voltage which is equal to the full charging voltage. These two charging operations are switched by using various kinds of detection and control circuits so that the secondary battery is properly charged in a short time. Further, the charger of the present invention is provided with a circuit for charging a plurality of battery cells simultaneously or separately.

7 Claims, 26 Drawing Sheets

METHOD FOR CHARGING SECONDARY BATTERY AND CHARGER USED THEREFOR

BACKGROUND OF THE INVENTION

1. Field of the Invention

The present invention relates to a method for charging a secondary battery such as a lead/lithium ion type battery and a charger to be used therefor.

2. Description of the Related Art

As shown in FIG. 1 which is a block diagram of one example of a conventional charger, the current from a power supply 101 is made constant by a constant current circuit 10 and then supplied to a lithium/ion type secondary battery 104 through a constant voltage circuit 103. Consequently, the secondary battery 104 is charged with a constant current.

Thus, when the voltage of the secondary battery 104 becomes equal to full charging voltage Vc due to the above operation, a constant voltage circuit 103 operates as shown in FIG. 2. The current I outputted from the constant current circuit 102 is gradually reduced to prevent the voltage V of the secondary battery 104 from beginning higher than the full charging voltage $V_c$. Then, when the current I becomes smaller than a predetermined value, the charging operation is complete.

Now, the secondary battery 104 is actually composed of an ideal battery and an inner resistor r as shown in FIG. 3(a). Further, the constant voltage circuit 103 is also composed of an ideal constant voltage circuit and an inner resistor $r_0$ as shown in FIG. 3(b).

Accordingly, there has been the problem that while the secondary battery 104 is being charged, the voltage V of the secondary battery 104 is as shown by the solid line in FIG. 2 but when the charging operation ceases, the voltage V is reduced as shown in the dotted line in FIG. 2 due to the voltage drop across the inner resistor r or $r_0$.

Therefore, there has been proposed a method in which the battery charging time with a constant voltage is extended to reduce the lowering of the charging voltage due to the voltage drop across the internal resistors r and r0. However, this method has had the problem of increased charging time.

Further, as described above, since the constant voltage circuit 103 has the inner resistor r0, when the constant voltage circuit 103 is in operation, a smaller the current flowing through the circuit 103, will result in a lower loss due to the inner resistor $r_0$.

However, this method also has had the problem that since a comparatively large current flows through the constant voltage circuit 103 as shown by the solid lines marked I in FIG. 2 immediately after the constant voltage circuit 103 has started, the voltage drop is initially large.

FIG. 4 shows a second example of a conventional secondary battery charger. As shown, this charger is so constructed that a chargeable battery (secondary) 201 is charged with a constant current from a constant current circuit 202. If the battery 201 is of nickel-hydrogen type or nickel-cadmium type, the charging characteristic of the battery will be as shown in FIG. 5.

Thus, in FIG. 5, when the battery 201 is charged with a constant current $I_0$ outputted from the constant current circuit 202, the terminal voltage V of the battery 201 increases gradually as the charging operation progresses and if a full charged state is achieve (i.e., a state in which the battery is charged neither too much nor too little), the terminal voltage V drops to some degree. If, therefore, the charging operation is stopped when such voltage drop (−ΔV) is detected, it is possible to complete the charging operation in a state in which the battery 201 is properly charged.

However, where the battery 201 is of nickel-hydrogen type or nickel-cadmium type, the terminal voltage 201 drops when the battery is fully charged in FIG. 5, but where the battery is of lead-lithium type, the terminal voltage V of the battery does not drop when the battery is fully charged. Consequently, when the lead/lithium type battery (i.e., a lead battery, lithium battery or lithium-ion type battery, which will be hereinafter merely referred to as a battery of lead-lithium ion type), no fully charged state is detected and it is difficult to properly stop the charging operation. That is, if the charging operation is stopped when the terminal voltage of the battery reaches a value of $V_0$, the battery is not yet in its fully charged state but in an insufficiently charged state. However, if the battery is charged for a long time after the terminal voltage of the battery reaches the value $V_0$, the battery will become overcharged and destroyed in the worst case.

For the above reason, where a lead/lithium ion type battery is charged, the circuit structure shown in FIG. 6 is used. In FIG. 6, the lead/lithium-ion type battery 211 is charged by a constant current circuit 212 or a constant voltage circuit 213 through a switch 214. The switch 214 is kept switched upward in FIG. 6 when the battery is first charged and the battery 211 is charged with a constant current $I_0$ outputted from the constant current circuit 212. Then the switch 214 is switched downward in FIG. 6 at a predetermined time so that the battery 211 is charged with a constant voltage $V_0$ outputted from the constant voltage circuit 213.

In FIG. 7 which shows charging curves at the time of charging the battery 211 through the circuit shown in FIG. 6, as the charging operation with the constant current $I_0$ progresses, the terminal voltage V of the battery 211 gradually increases and when the switch 214 is operated to allow a charging operation with the constant voltage $V_0$ to be effected from the charging operation with the constant current $I_0$, the terminal voltage V remains to be $V_0$ while the charging current $I_0$ decreases gradually as shown in FIG. 7. The charging current I is measured during this charging operation and when the measured value is less than a predetermined value, the battery becomes fully charged and the charging operation is stopped.

Thus, when the battery 211 is charged by the constant current circuit 212 and the constant voltage circuit 213, it is possible to charge the battery 211 in an optimum state without destroying the battery.

However, this method of switching from the constant current charging operation to the constant voltage charging operation has had the problem of requiring a long charging time.

SUMMARY OF THE INVENTION

The present invention has been made in view of the abovedescribed circumstances and an object of the invention is to allow a secondary battery to be fully charged in a short time.

Another object of the present invention is to provide a charger which is suitably used for performing the secondary battery charging method of the present invention.

A secondary battery charging method according to the present invention is that a secondary battery 7 is charged with a constant current until the voltage of the battery becomes equal to a predetermined reference voltage higher than a full charged voltage Vc and then the battery is further charged with a constant voltage equal to a full charged voltage $V_c$.

The secondary battery charging method according to the present invention also features that in the method described above, the voltage applied on the secondary battery 7 during the time of charging the battery with the constant current is detected and the battery is charged with the constant current until a predetermined time $t_T$ lapses from the time when the voltage becomes equal to the full charging voltage, and after a lapse of the predetermined time, the secondary battery 7 is further charged with a constant voltage equal to the full charging voltage $V_c$.

The secondary battery charging method according to the present invention further features that in a method in which the voltage applied on the secondary battery 7 is controlled by a constant voltage source equal to the full charging voltage $V_c$ and then charged with a constant current from a constant current source, the decreasing amount of current supplied to the secondary battery 7 when the voltage of the battery is charged by the constant voltage source is detected and then the battery is charged with the constant current source without controlling the battery voltage by the constant voltage source until the predetermined period of time $t_T$ lapses.

Further, it should be noted that in the present invention, the secondary battery is charged with a constant current, the charging voltage of the battery is detected and when it reaches a predetermined value, the supply of the constant current to the secondary battery is interrupted periodically. Then the charging operation is terminated when the voltage across the secondary battery becomes a reference voltage in a state in which the constant current is not supplied to the battery.

DESCRIPTION OF THE PREFERRED EMBODIMENTS

(1) Embodiment 1

Figure 8:
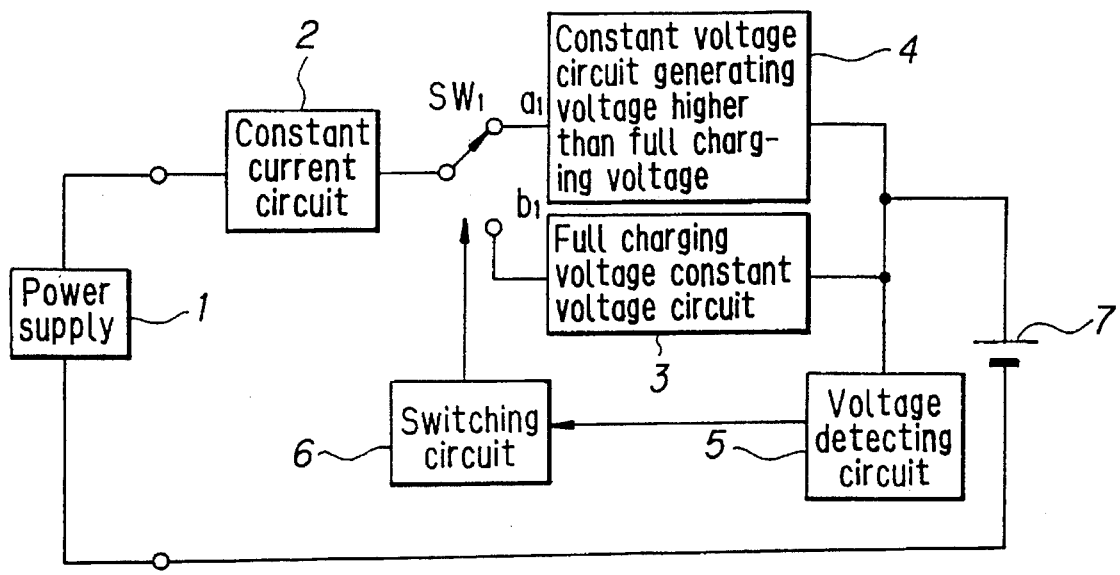
FIG. 8 is a block diagram of a charger according to one embodiment of the present invention.

Referring to FIG. 8 which is a block diagram of a charger according to one embodiment of the present invention, a power supply 1 supplies an electrical current to a constant current circuit 2 which in turn makes the electrical current constant. A constant voltage circuit 3 makes the voltage across its output terminal and ground equal to a full charging voltage $V_c$ for a secondary battery 7 (e.g., about 4.2±0.05 [V]). That is, the constant voltage circuit 3 controls the voltage applied on the secondary battery 7 to the full charging voltage Vc (e.g., 4.2±0.05 [V]).

A constant voltage circuit 4 makes the voltage across the output terminal and the ground equal to a reference voltage Vc' (a voltage of a level at which the secondary battery 7 is not damaged, e.g., about 4.35±0.05 [V]. That is, the constant voltage circuit 4 controls the voltage applied on the secondary battery 7 to the predetermined reference voltage $V_c'$.

A voltage detection circuit 5 detects the voltage across the terminals of the secondary battery 7. A switching circuit 6 turns a switch $SW_1$ which normally connects a terminal $a_1$ to a terminal $b_1$.

The secondary battery 7 is of lead/lithium type, for example, and is detachable from a charger. This secondary battery can also be fixed to the charger.

Where the secondary battery 7 is charged by the charger of the above-described structure, the switch $SW_1$ is normally turned to the terminal $a_1$ by the switching circuit 6 whereby a constant current I of a predetermined value outputted from the constant current circuit 2 is supplied to the secondary battery 7 through the switch $SW_1$, terminal $a_1$ and the constant voltage circuit 4.

Figure 9:
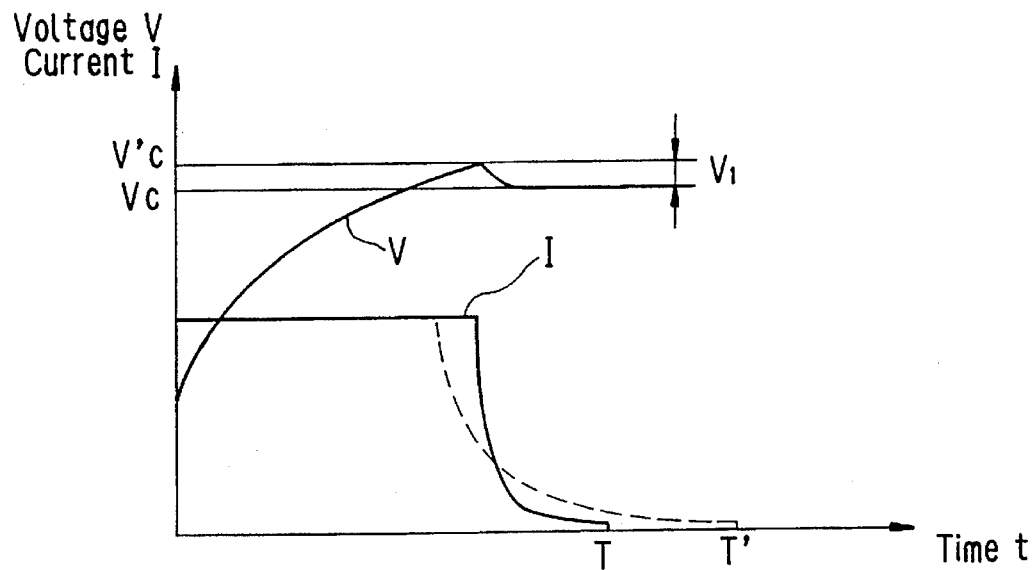
FIG. 9 is a graph showing variation curves of a current and a voltage supplied to a secondary battery from the charger of FIG. 8, plotted against time.

When the charging of the secondary battery 7 by the constant current circuit 2 is started, the impedance of the secondary battery 7 increases so that the voltage V applied across the terminals of the battery increases gradually to exceed the full charging voltage $V_c$ as shown in FIG. 9 to the reference voltage $V_c'$ which is higher than the voltage $V_c$. At this moment, the constant voltage circuit 4 operates to control the voltage V of the secondary battery 7 to the reference voltage $V_c'$. That is, the charging with the constant current from the constant current circuit 2 is switched to charging with the constant voltage $V_c'$ to be applied by the constant voltage circuit 4.

At the same time, the voltage V of the secondary battery 7 is detected by the voltage detection circuit 5 and outputted to the switching circuit 6. Then, as described above, when the voltage V of the secondary battery 7 reaches the reference voltage $V_c'$ beyond its full charging voltage $V_c$, the switching circuit 6 turns the switch $SW_1$ from the terminal $a_1$ to the terminal $b_1$.

Accordingly, the switch $SW_1$ is turned to the terminal $b_1$ whereupon the voltage V of the secondary battery 7, which has already become the predetermined reference voltage Vc' exceeding the full charging voltage $V_c$ of the secondary battery as the operating voltage of the constant voltage circuit 3, is immediately controlled to the voltage $V_c$.

That is, when the voltage V of the secondary battery 7 reaches the predetermined reference voltage Vc' higher than the full charging voltage $V_c$, the switch $SW_1$ is turned to the terminal $b_1$ allowing the battery 7 to be charged with the constant voltage applied by the constant voltage circuit 3. After the initiation of charging by the constant voltage circuit 3, the current I flowing through the battery 7 decreases with an increase in the impedance of the battery 7 and when the current I is below a predetermined value, the charging is terminated.

It has been usual in this connection that the increase in the voltage of the secondary battery 7 is monitored. When it reaches the full charging voltage $V_c$ the charging of the battery 7 with the constant voltage equal to the full charging voltage $V_c$ is initiated and the current supplied to the battery 7 begins to decrease as shown by the dotted line of FIG. 2. However, in the case of the charger of the present invention, the charging of the battery 7 with the constant voltage equal to the full charging voltage $V_c$ is initiated when the voltage of the battery 7 reaches the predetermined reference voltage $V_c'$ higher than the voltage $V_c$. That is, with the use of the present charger, the time for charging the battery 7 with the constant current I is longer than in the case of the conventional charger as shown by the dotted line of FIG. 9.

Figure 1:
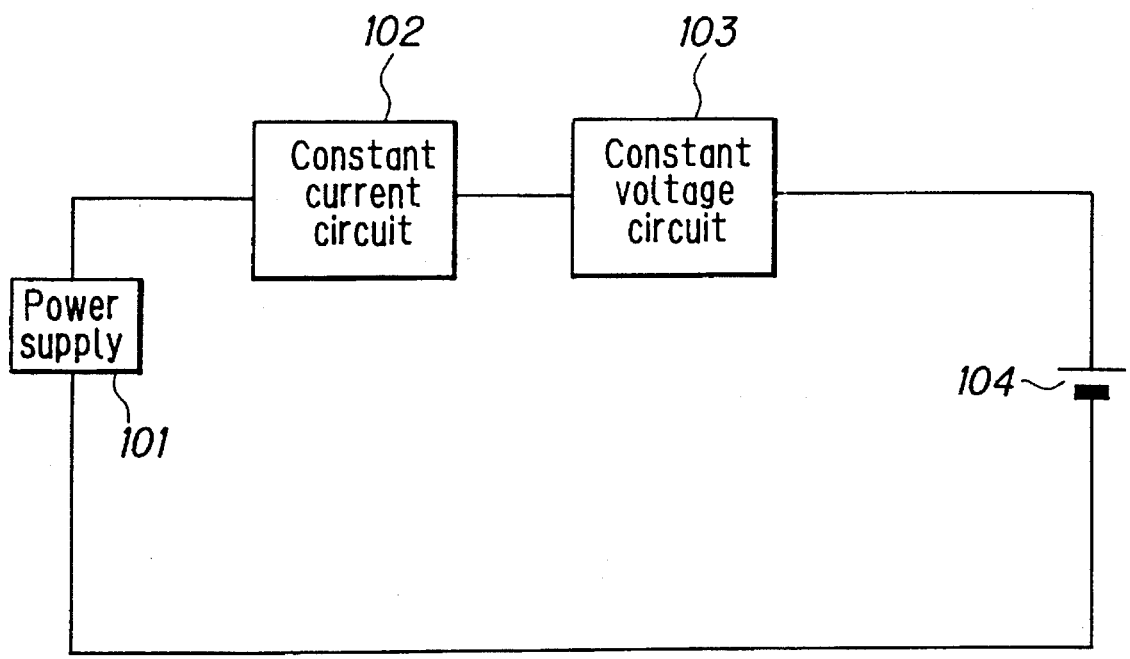
FIG. 1 is a block diagram of one example of a conventional charger.
Figure 2:
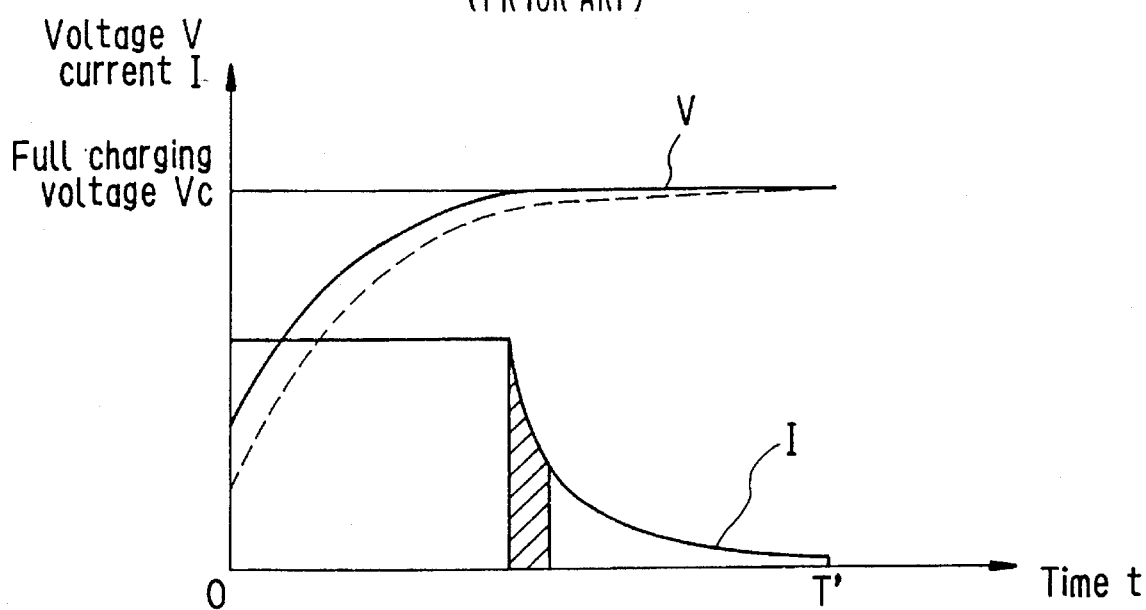
FIG. 2 is a graph showing variation curves of a current and a voltage supplied to a secondary battery from a conventional charger plotted against time.
Figure 3A:
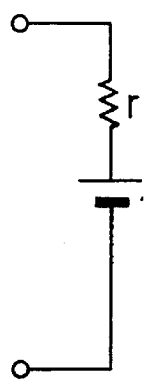
FIGS. 3 (a) and (b) are diagrams illustrating inner resistor connections, respectively.
Figure 3B:
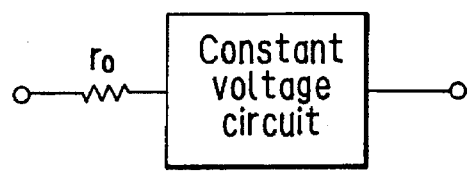

The energy supplied to the secondary battery 7 by charging is equal to the value obtained as a result of time-integrating the current I shown in FIG. 2, that is, equal to the area surrounded by the axis of ordinate, axis of abscissa and the current curve I in FIG. 9 and accordingly, by the use of the present charger, in lieu of the energy indicated by the area $S_1$ which has hitherto been supplied to the secondary battery 7 due to the charging with the constant voltage, the energy indicated by $S_2$ is supplied to the secondary battery 7 due to the charging with the constant current.

That is, in the case of the present charger, most of the energy (corresponding to the area $S_1$) which has hitherto been supplied to the secondary battery 7 due to the charging of the battery with the constant voltage is supplied to the secondary battery 7 due to the charging thereof with the constant current. Therefore, the energy supplied to the secondary battery 7 due to the charging with the constant voltage can be saved when compared to the conventional charger.

In view of the foregoing, with the charger shown in FIG. 8, the secondary battery 7 is charged with the constant current from the constant current circuit 2 until the reference voltage $V_c'$ higher than the full charging voltage $V_c$ is reached and after that, when the charging with the constant voltage $V_c$ from the constant voltage circuit 3 is initiated, the current flowing through the secondary battery 7 decreases instantaneously as shown in FIG. 2 and falls below a predetermined value in a shorter time.

Consequently, it is possible to sufficiently charge the secondary battery 7 in a short time. Further, since the time for charging by the constant current circuit 3 is short and the current flowing therethrough is small, it is possible to reduce the power loss in the inner resistor of the constant current circuit 3.

Further, in the case of the present charger, the voltage applied on the secondary battery 7 at the time of charging the constant current from the constant current circuit 2 is so set as to be controlled to the reference voltage Vc' by means of the constant voltage circuit 4. That is, the voltage applied on the secondary battery 7 is so set that it does not become higher than the reference voltage $V_c'$. Accordingly, the damage to the battery due to the application of a high voltage thereon can be prevented which results in improving the safety of the apparatus.

It should be noted that although in the case of the present charger, the switch $SW_1$ is made to turn from the terminal $a_1$ to the terminal $b_1$ when the voltage V across the secondary battery 7 becomes equal to the reference voltage $V_c'$, it is also possible to allow the switch $SW_1$ to turn when the difference between the voltage V applied to the secondary battery 7 and the full charging voltage Vc becomes equal to the voltage indicated by $V_1$ in FIG. 9, that is, (the reference voltage Vc'−(minus) full charging voltage $V_c$). Alternatively, the switch $SW_1$ may be so designed as to turn only when the above two conditions are satisfied.

(2) Embodiment 2

Figure 10:
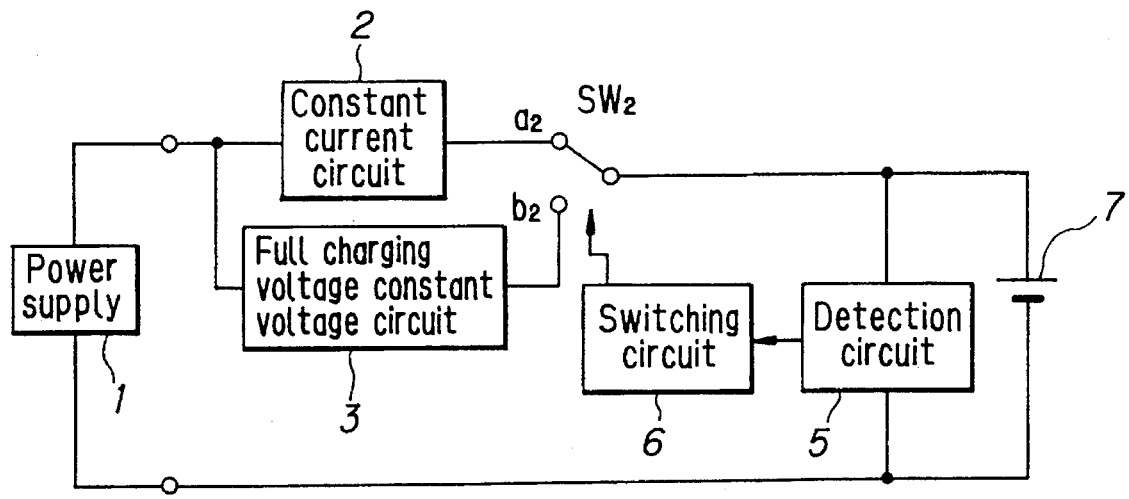
FIG. 10 is a block diagram of a charger according to a second embodiment of the present invention.

FIG. 10 is a block diagram of a charger according to a second embodiment of the present invention. In this figure, parts corresponding to those shown in FIG. 8 are designated by the same reference numerals. Further, although the constant current circuit 2 and the constant voltage circuit 3 (or 4) in FIG. 8 are connected in series with each other to thereby form a charger, the two circuits in FIG. 10 are connected parallel with each other to thereby form a charger.

In the case of this charger, a switch $SW_2$ is turned to a terminal $a_2$ and as in the case of FIG. 8, the secondary battery 7 is first charged with the constant current from the constant current circuit 2 and after that, when the voltage V across the secondary battery 7 reaches the predetermined reference voltage Vc' higher than its full charging voltage $V_c$, the switch $SW_2$ is turned from the terminal $a_2$ to a terminal $b_2$ to allow the secondary battery to be charged with the constant voltage equal to the full charging voltage $V_c$ supplied from the constant voltage circuit 3. Therefore, it will be seen that the charging of the secondary battery 7 is sufficient by use of this charger also.

Moreover, unlike the charger of FIG. 8, this charger is constructed without the provision of the constant voltage circuit 4 which generates the predetermined reference voltage higher than the full charging voltage $V_c$. Consequently, although the safety of the charger is inferior to that of the charger of FIG. 8, the entire apparatus can be made small-sized. Further, the switch $SW_2$ may be provided on the input terminal sides of the constant current circuit 2 and the constant voltage circuit 3 instead of the output terminal sides of the two circuits.

(3) Embodiment 3

Figure 11:
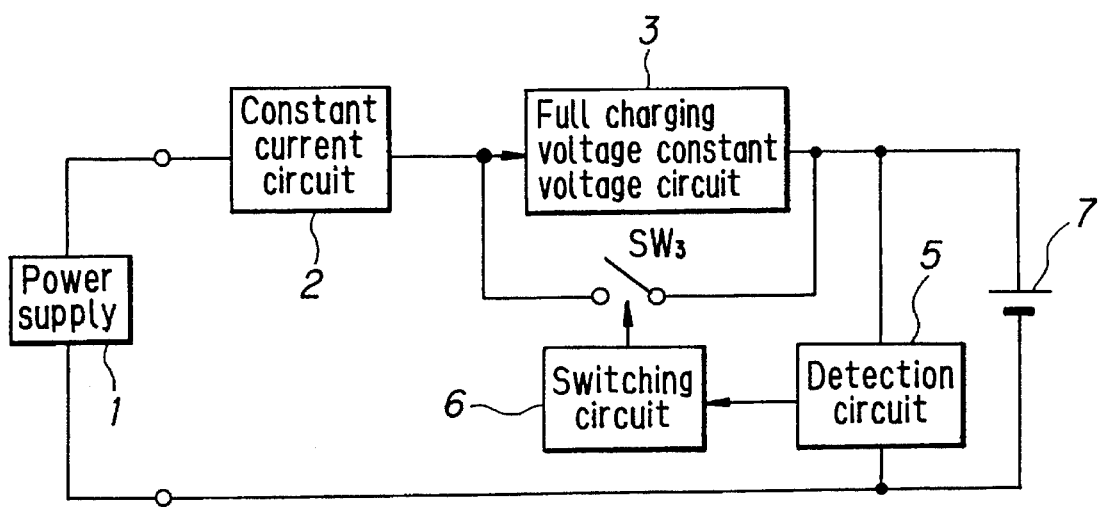
FIG. 11 is a block diagram of a charger according to a third embodiment of the present invention.

FIG. 11 is a block diagram of a charger according to a third embodiment of the present invention. In this figure, parts corresponding to those shown in FIG. 8 are designated by the same reference numerals. In this charger, a switch $SW_3$ which is usually kept ON is turned OFF by the switching circuit 6 when the voltage V across on the secondary battery 7 exceeds the predetermined reference voltage $V_c'$ which is higher than the full charging voltage Vc.

Accordingly, as in the case of the charger of FIG. 8, this charger charges the secondary battery 7 with the constant current supplied from the constant current circuit 2 through the ON-state switch $SW_3$ and bypassing the constant voltage circuit 3. When the voltage V to be applied on the secondary battery 7 reaches (or exceeds) the predetermined reference voltage $V_c'$ which is higher than the full charging voltage Vc, the switch $SW_3$ is turned OFF and the secondary battery 7 is charged with the constant voltage equal to the full charging voltage $V_c$ supplied from the constant voltage circuit 3. Accordingly, it is possible to sufficiently charge the secondary battery 7 in a short time with this charger also.

Further, as in the case of the charger of FIG. 10, this charger is constructed without the provision of the constant voltage circuit 4 of FIG. 8 which generates the predetermined reference voltage which is higher than the full charging voltage $V_c$. Consequently, although the safety of the charger is somewhat inferior to the charger of FIG. 8, the entire apparatus can be made small-sized.

(4) Embodiment 4

Figure 12:
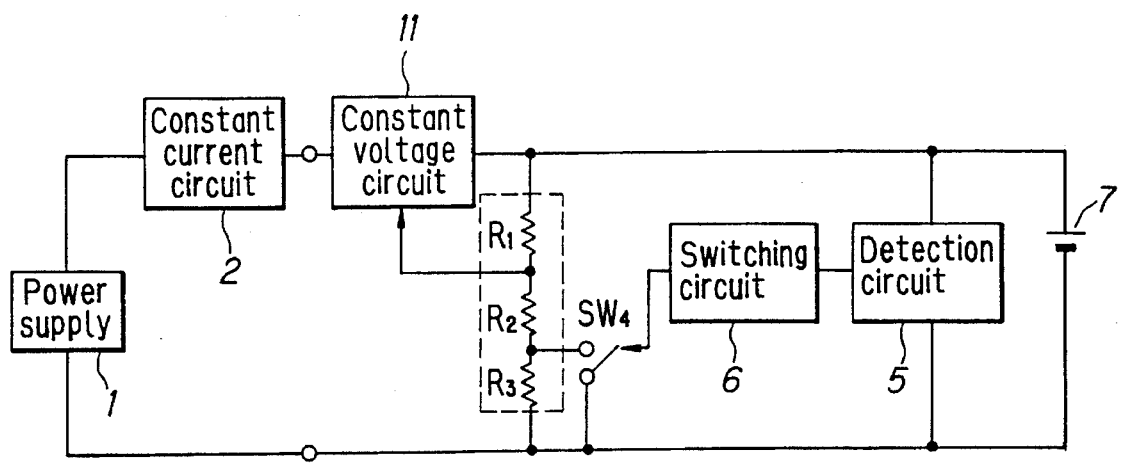
FIG. 12 is a block diagram of a charger according to a fourth embodiment of the present invention.

FIG. 12 is a block diagram of a charger according to a fourth embodiment of the present invention. In this figure, parts corresponding to those shown in FIG. 8 are designated by the same reference numerals. As shown, resistors $R_1$, $R_2$ and $R_3$ are connected in series with one another such that one end of the resistor $R_1$ not connected to the resistor $R_2$ is connected to the positive side of the secondary battery 7 and one end of the resistor $R_3$ not connected to the resistor $R_2$ is connected to the negative side of the secondary battery 7. Further, the junction of the resistors $R_1$ and $R_2$ is connected to a control terminal S of a constant voltage circuit 11.

Further, the junction of the resistors $R_1$ and $R_2$ is grounded through a switch $SW_4$ and therefore, the control terminal S of the constant voltage circuit 11 is applied with a voltage obtained by dividing the voltage V applied on the secondary battery 7 by the resistors $R_1$, $R_2$ and $R_3$ when the switch $SW_4$ is OFF, and with a voltage obtained by dividing the voltage V applied on the secondary battery 7 by the resistors $R_1$ and $R_2$ when the switch $SW_4$ is ON.

The constant voltage circuit 11 generates a constant voltage equal to the predetermined reference voltage $V_c'$ which is higher than the full charging voltage $V_c$ of the secondary battery 7 when the voltage obtained by dividing the voltage V on the secondary battery 7 by the resistors $R_1$, $R_2$ and $R_3$ and inputted to the control terminal S when the switch $SW_4$ is OFF while it generates a constant voltage equal to the full charging voltage $V_c$ of the secondary battery 7 when the voltage obtained by dividing the voltage V applied on the secondary battery 7 by the resistors $R_1$ and $R_2$ and inputted to the control terminal S when the switch $SW_4$ is ON.

The switch $SW_4$ is usually kept OFF but when the voltage V applied on the secondary battery exceeds the reference voltage $V_c'$ which is higher than the full changing voltage $V_c$, it is kept On by the switching circuit 6.

As in the case of the charger of FIG. 8, the charger of the above-described structure charges the secondary battery 7 with the constant current supplied from the constant current circuit 2 through the constant voltage circuit 11. After that, when the voltage V on the secondary battery 7 reaches (or exceeds) the predetermined reference voltage Vc which is higher than the full charging voltage $V_c$, the switch $SW_4$ is turned ON from its OFF state whereby the constant voltage circuit 11 generates a constant voltage equal to the full charging voltage $V_c$ and the secondary battery 7 is charged with this constant voltage. Therefore, it is possible to sufficiently charge the secondary battery 7 in a short time with this charger.

Further, in the case of the present charger, when the switch $SW_4$ is OFF, i.e., when the secondary battery 7 is being charged with the constant current, the voltage V applied on the secondary battery 7 is controlled by the constant voltage circuit 11 so as not to become higher than the reference voltage $V_c'$. Accordingly, the damage to secondary battery 7 due to the application of a high voltage on the battery can be prevented thereby improving the safety of the apparatus.

(5) Embodiment 5

Figure 13:
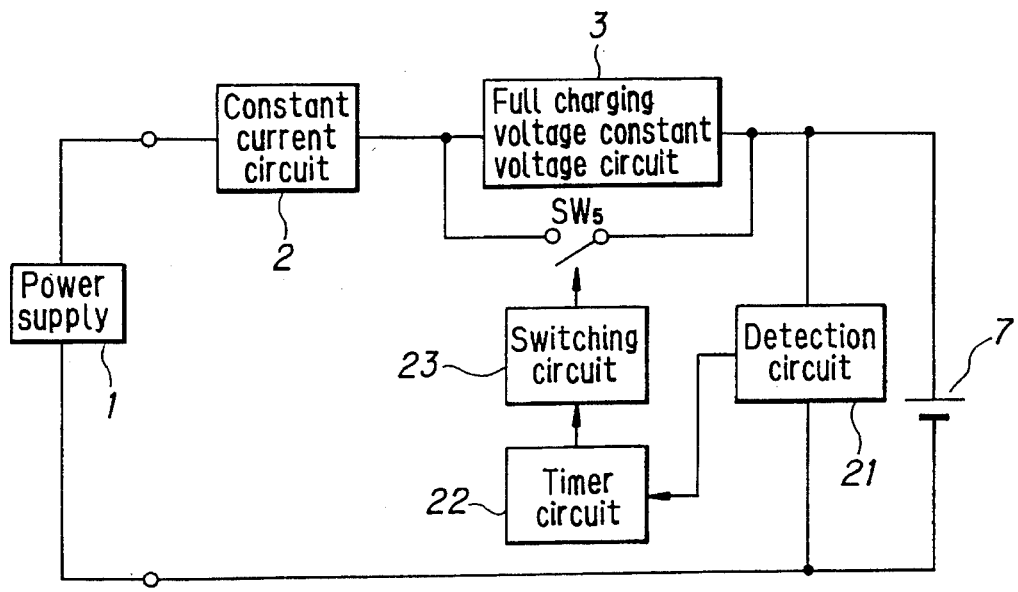
FIG. 13 is a block diagram of a charger according to a fifth embodiment of the present invention.

FIG. 13 is a block diagram of a charger according to a fifth embodiment of the present invention. In this figure, parts corresponding to those shown in FIG. 11 are designated by the same reference numerals. As shown, a detection circuit 21 detects the voltage V applied on the secondary battery 7 and the detected voltage is outputted to a timer circuit 22. The timer circuit 22 counts a predetermined period of time $t_T$ from the time when the voltage V on the secondary battery 7 detected by the detection circuit 21 reaches the full charging voltage $V_c$ and when the counting is complete, outputs a control signal to a switching circuit 23.

It should be noted that the predetermined period of time $t_T$ is substantially equal to a period of time lapsed from the time when the voltage V of the secondary battery 7 being charged with the constant current becomes equal to the full charging voltage $V_c$ to the time when it becomes equal to the predetermined reference voltage $V_c'$ and it is hereinafter referred to as the "timer operating time" which is set up by advance measurement. Upon reception of the control signal from the timer circuit 22, the switching circuit 23 opens a normally closed switch $SW_5$.

Figure 14:
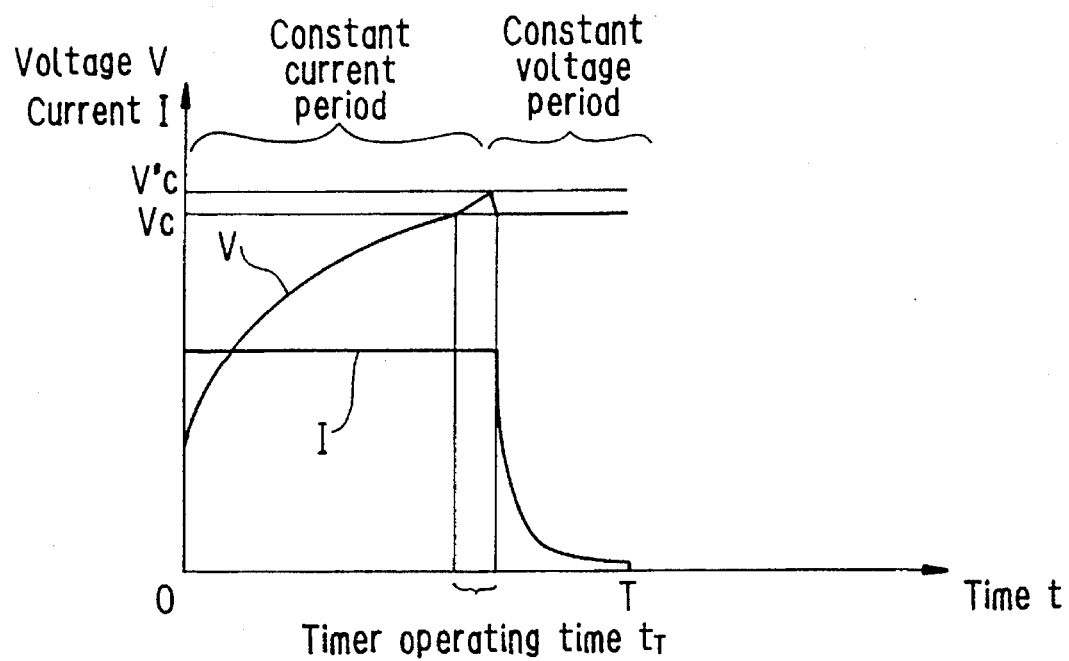
FIG. 14 is a graph showing variation curves of a current and a voltage supplied to a secondary battery from the charger of FIG. 13 plotted against time.

As shown in FIG. 14, the charger of the above-described structure first charges the secondary battery 7 with the constant current supplied from the constant current circuit 2 through the normally closed-switch $SW_5$ and by bypassing the constant voltage circuit 3. After that, when the voltage V to be applied on the secondary battery 7 reaches (or exceeds) its full charging voltage Vc, the timer operating time $t_T$ is counted by the timer circuit 22. Then, when the timer operating time $t_T$ lapses from the time when the voltage V on the secondary battery 7 has reached the full charging voltage $V_c$, the switch $SW_5$ is turned from ON to OFF and the secondary battery 7 is charged with the constant voltage equal to the full charging voltage $V_c$ and supplied from the constant voltage circuit 3.

Accordingly, since in the above case the constant current charging is performed for a time longer than in the case of the conventional charger by the timer operating time $t_T$ as shown in FIG. 14, if the charging with the constant voltage Vc supplied from the constant voltage circuit 3 is initiated after the charging with the constant current as already explained with reference to FIG. 19, the current flowing through the secondary battery 7 decreases instantaneously to become less than a predetermined value in a shorter time. Therefore, the secondary battery 7 can be sufficiently charged in a shorter time.

(6) Embodiment 6

Figure 15:
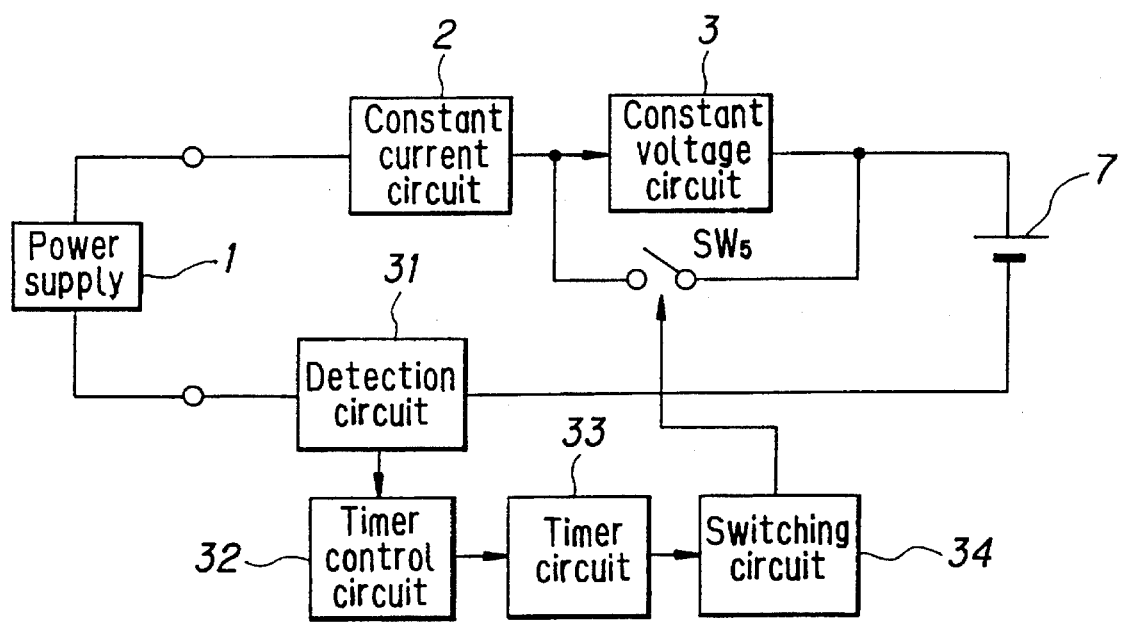
FIG. 15 is a block diagram of a charger according to a sixth embodiment of the present invention.

FIG. 15 is a block diagram of a charger according to a sixth embodiment of the present invention. In this figure, parts corresponding to those shown in FIG. 13 are designated by the same reference numerals. As shown, a detection circuit 31 detects the current flowing through the circuit, i.e., the secondary battery 7, and outputs the detected current to a timer control circuit 32. The timer control circuit 32 detects the amount of decrease in the detected current and outputs a detection signal to a timer circuit 33 and a switching circuit 34 through the circuit 33.

Upon reception from the timer control circuit 32 of the detection signal indicative of a decrease in the current flowing through the secondary battery 7, the timer circuit 33 counts the timer operating time $t_T$ as in the case of the timer circuit 22 of FIG. 13 and upon completion of the counting, outputs a control signal to the switching circuit The switching circuit 34 usually keeps the switch $SW_5$ OFF but when it receives from the timer control circuit 32 through the timer circuit 33, the detection signal indicating the decrease of the current flowing through the secondary battery 7, it turns the switch $SW_5$ ON. Then, when the timer operating time $t_T$ lapses and the circuit 34 receives the control signal from the timer circuit 33, it turns the switch $SW_5$ OFF again.

Figure 16:
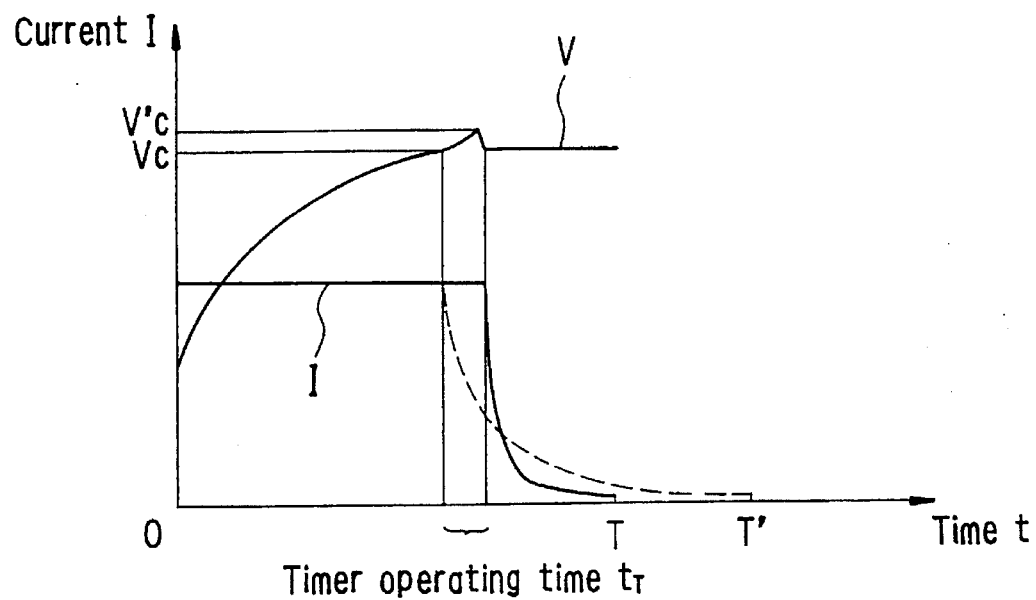
FIG. 16 is a graph showing variation curves of a current and a voltage supplied to a secondary battery from the charger of FIG. 15, plotted against time.

When the charging of the secondary battery 7 is initiated by the charger of the above-described structure, since the $SW_5$ is initially kept OFF, the secondary battery 7 is charged with the constant current supplied from the constant current circuit 2 through the constant voltage circuit 3 and after that, when the voltage V of the secondary battery 7 reaches its full charging voltage $V_c$, the constant voltage circuit 23 operates so that the current from the constant current circuit 2, that is, the current I flowing through the secondary battery 7, begins to decrease as shown by the dotted line of FIG. 16 lest the voltage on the secondary battery 7 should become higher than its full charging voltage $V_c$.

This decrease of the current I is detected by the timer control circuit 32 and a detection signal is outputted to the timer control circuit 33 and the switching circuit 34. The switching circuit 34 turns the switch $SW_5$ ON upon reception of the detection signal from the timer control circuit 32.

Thus, when the above condition is brought about, the charging of the secondary battery 7 with the constant current, which is supplied from the constant current circuit 2 through the ON-state switch $SW_5$ and bypasses the constant voltage circuit 3, is restarted and at the same time, the timer operating time $t_T$ is counted by the timer circuit 33. Then, when the timer operating time $t_T$ lapses from the time of detection of the decrease in the current I flowing through the secondary battery 7, that is, from the time when the voltage V of the secondary battery 7 reaches its full charging voltage $V_c$ (in this case, the voltage applied on the secondary battery 7 becomes substantially equal to the reference voltage Vc' as shown in FIG. 16), the ON-state switch $SW_5$ is again turned OFF by the switching circuit 34 and the secondary battery 7 is charged with the constant voltage equal to the full charging voltage Vc supplied from the constant voltage circuit 3.

Accordingly, since the charging with the constant current is performed for a time longer than in the case of the conventional charger by the timer operating time $t_T$ as shown in FIG. 16, when the charging with the constant voltage Vc from the constant voltage circuit 3 is initiated after the charging with the constant current, the current flowing through the battery 7 decreases instantaneously to be smaller than a predetermined value in a shorter time, as explained with reference to FIG. 9. Consequently, the secondary battery 7 can be sufficiently charged in a shorter time.

The timer control circuit 32 can be so set that it causes a decrease in the current flowing through the circuit and sets a counting time for the timer circuit 33 on the basis of the current flowing through the secondary battery 7 at the time of charging.

Where the secondary battery has a residual charge (for example, the amount of discharge from the secondary battery 7 is only about half the tolerance and etc.), the amount of current flowing therethrough at the time of charging differs from that in the case where the discharge from the secondary battery is almost complete. Accordingly, by causing the timer control circuit 32 to set up a time for allowing the timer circuit 33 to count on the basis of the current flowing therethrough at the time of charging as described in the foregoing, it is possible to charge the secondary battery 7 in a manner more suitable for the condition of the secondary battery 7.

(7) Embodiment 7

Figure 17:
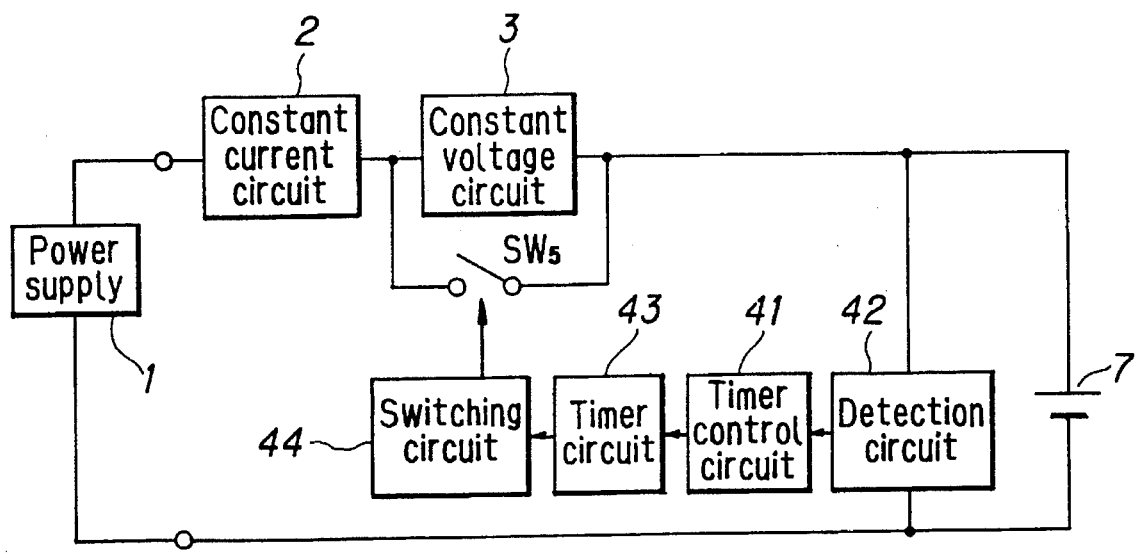
FIG. 17 is a block diagram of a charger according to a seventh embodiment of the present invention.

FIG. 17 is a block diagram of a charger according to a seventh embodiment of the present invention. In this figure, parts corresponding to those shown in FIG. 13 are designated by the same reference numerals. As shown, a detection circuit 42 detects the voltage V applied on the secondary battery 7 and outputs a detection signal to a timer control circuit 41. The timer control circuit 41 determines whether or not the voltage V detected by the detection circuit 42 is equal to (or exceeds) the full charging voltage $V_c$ of the secondary battery and if yes, outputs a decision signal to a timer circuit 43 and to a switching circuit 44 through the circuit 43.

Upon reception of the decision signal from the timer control circuit 41, the timer circuit 43 counts the timer operating time $t_T$ as in the case of the timer circuit 22 of FIG. 13, and upon completion of the counting, outputs a control signal to the switching circuit 44.

The switching circuit 44 usually keeps the switch $SW_5$ OFF but when it receives from the timer control circuit 41 through the timer circuit 43 the decision signal indicating that the voltage V applied on the secondary battery 7 has exceeded the full charging voltage $V_c$, it turns the switch $SW_5$ ON. Then, when the timer operating time $t_T$ lapses and the switching circuit 44 receives the control signal from the timer circuit 43, it turns the switch $SW_5$ OFF again.

When the charging of the secondary battery 7 is initiated by the charger of the above-described structure, since the switch $SW_5$ is originally in its OFF-state, charging with the constant current supplied from the constant current circuit 2 through the constant voltage circuit 3 is performed and after that, when the voltage V applied on the secondary battery 7 reaches (exceeds) its full charging voltage Vc, the constant voltage circuit 3 operates so that the voltage V is prevented from becoming higher than the full charging voltage $V_c$.

The arrival of the voltage V on the secondary battery 7 at its full charging voltage $V_c$ is detected by the timer control circuit 41 and the decision signal is outputted to the timer circuit 43 and the switching circuit 44. Upon reception of the decision signal from the timer control circuit 41, the switching circuit 44 turns the switch $SW_5$ ON.

Figure 18:
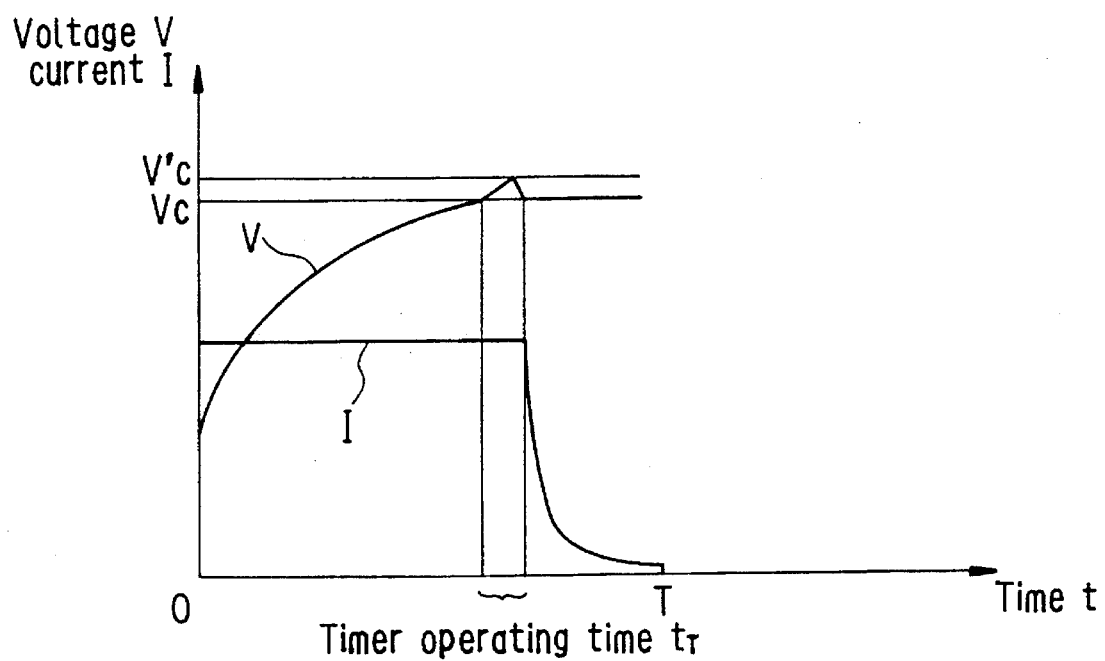
FIG. 18 is a graph showing variation curves of a current and a voltage supplied to a secondary battery from the charger of FIG. 17, plotted against time.

When the above-described state is brought about, the charging with the constant current I, which is supplied from the constant current circuit 2 through the ON-state switch $SW_5$ and which bypasses the constant voltage circuit 3, is started again and at the same time, the timer operating time $t_T$ is counted by the timer circuit 43. Then, when the timer operating time $t_T$ lapses from the time of decision by the timer control circuit 41 of the voltage V on the secondary battery 7 exceeding its full charging voltage $V_c$ (in this case, the voltage on the secondary battery 7 becomes substantially equal to the reference voltage $V_c'$ as shown in FIG. 18), the switch $SW_5$ is turned from ON to OFF again by the switching circuit 4. The charging with the constant voltage equal to the full charging voltage $V_c$ is supplied from the constant voltage circuit 3.

Figure 19:
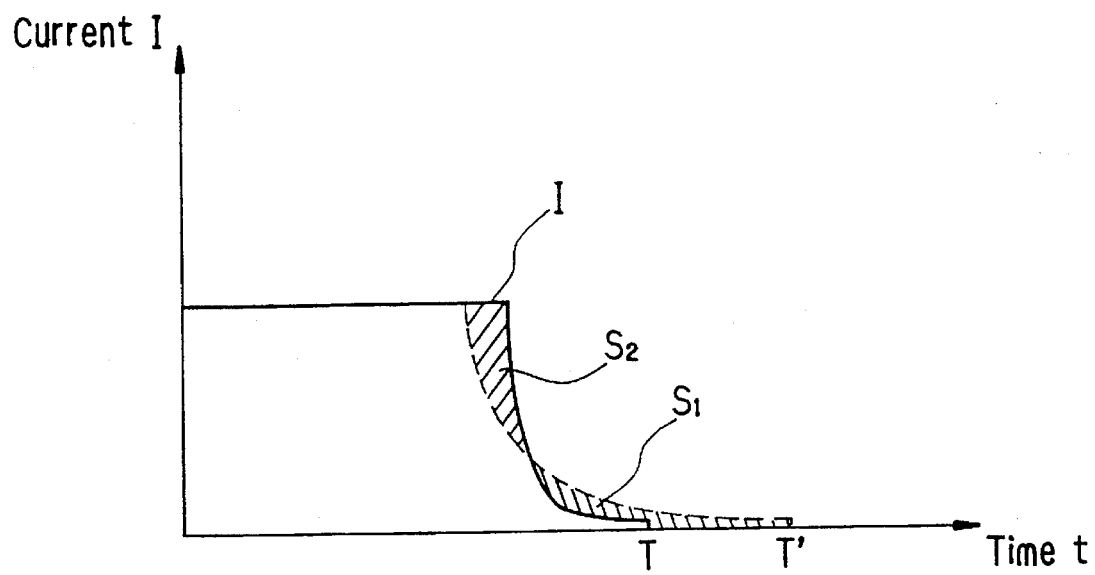
FIG. 19 is a graph showing a variation curve of a current supplied to a secondary battery, plotted against time.

Accordingly, since in the above case the charging with the constant current is performed for a time longer than in the case of the conventional charger by the timer operating time $t_T$ as shown in FIG. 18, when the charging with the constant voltage $V_c$ to be supplied from the constant voltage circuit 3 after the charging with the constant current is initiated, the current flowing through the secondary battery 7 decreases instantaneously, to be less than a predetermined value in a shorter time as described in the foregoing with reference to FIG. 19. Accordingly, the secondary battery 7 can be charged sufficiently in a short time.

It should be noted that although in the above-described charger the timer circuit 41 is caused to generate a decision signal when the voltage V applied on the secondary battery 7 becomes equal to the full charging voltage $V_c$, it is also possible to so construct the timer circuit 41 as to generate the decision signal when the difference between the voltage V and the voltage $V_c$ becomes zero. Alternatively, it is possible to allow the decision signal to be generated only when the above two conditions are satisfied.

Further, it is also possible to cause the timer control circuit 41 to set up a time for allowing the timer circuit 43 to count on the basis of the voltage applied on the secondary battery 7 at the time of initiation of charging. For example, where the secondary battery 7 has a residual charge, the voltage applied on the secondary battery 7 differs from that where the secondary battery 7 is discharging almost completely. Accordingly, as described above, by causing the timer control circuit 41 to set up a time for allowing the timer circuit 43 to count on the basis of the voltage across the secondary battery 7 at the time of charging, it is possible to charge the secondary battery 7 in a manner suited to the condition of the battery.

Figure 20:
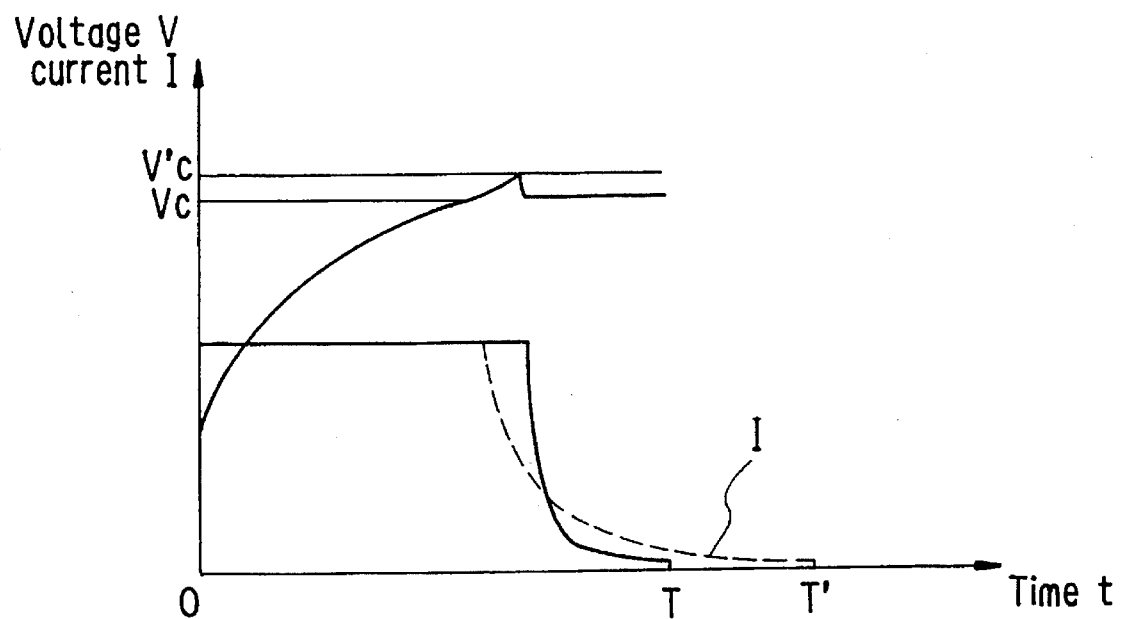
FIG. 20 is a graph showing variation curves of a charging current and a charging voltage from a charger according to the present invention, plotted against time.

As described above, according to the present invention, the value for the voltage V to be applied on the secondary battery 7 is so controlled that the charging current I, which has conventionally been made to vary as shown by the dotted line of FIG. 20, varies as shown by the solid line of the same figure and therefore, the secondary battery 7 can be charged sufficiently in a shorter time.

Further, although the present embodiment has been described with reference to a case where a lead/lithium ion type secondary battery 7 is used, all the other types of secondary batteries for which no detection of the so called - ΔV is possible may be available.

Figure 21:
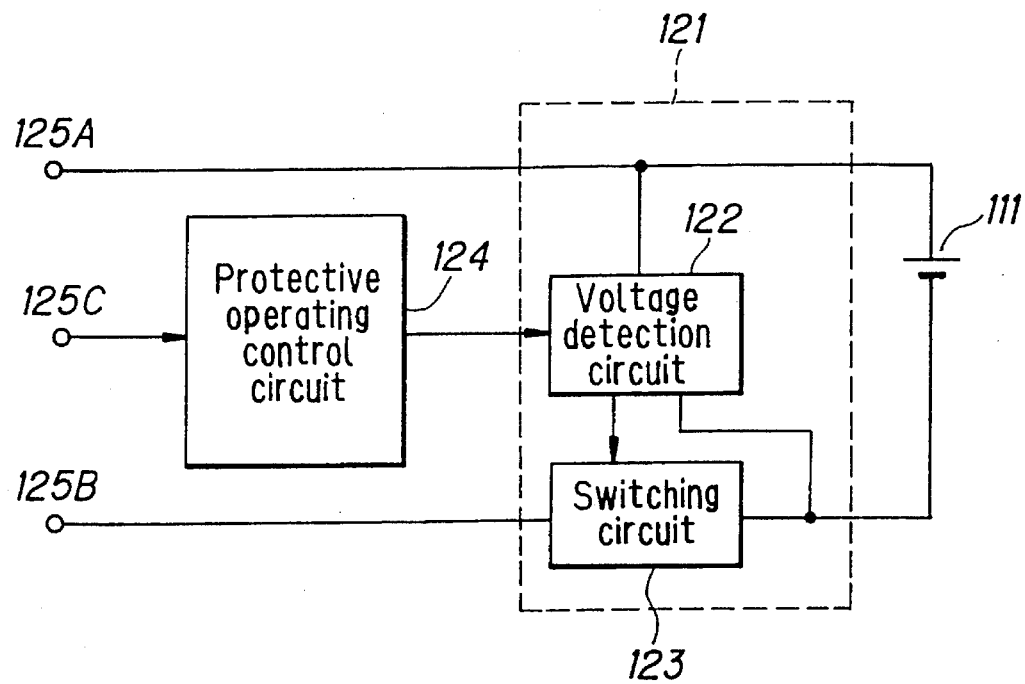
FIG. 21 is a block diagram of one embodiment of a battery pack according to the present invention.

FIG. 21 shows the internal electrical structure of a battery pack (a secondary battery unit) used in the present invention. As shown in this figure, in the present embodiment, a battery 11 is charged with a current supplied from terminals 125A and 125B through a switching circuit 123 of a protective circuit 121. A voltage detection circuit 122 of the protective circuit 121 detects the terminal voltage of the battery 111 and controls the switching circuit 123 in response to the result of detection. A protective operation control circuit 124 detects an identification signal to be inputted from a terminal 125C and the detected signal is outputted to the voltage detection circuit 124.

(8) Embodiment 8

Figure 22:
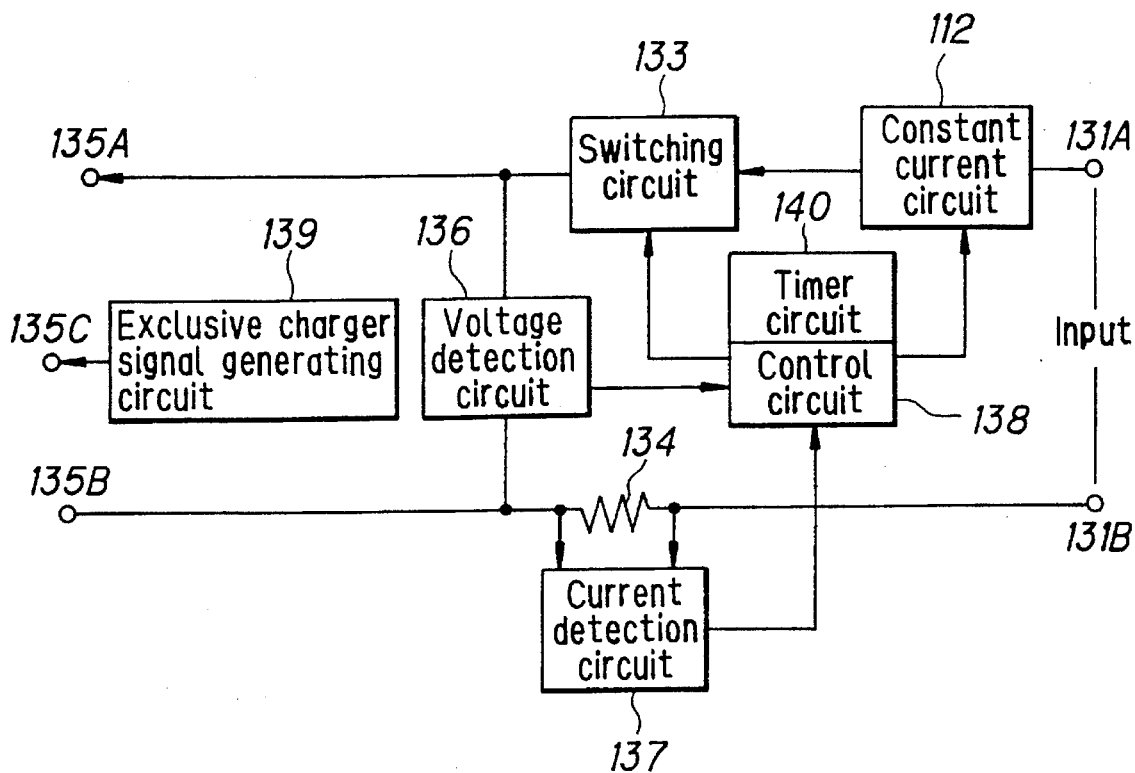
FIG. 22 is a block diagram of a secondary battery charger according to an eighth embodiment of the present invention.

FIG. 22 shows a charger (a secondary battery charging apparatus) which is exclusively used for charging the battery pack shown in FIG. 21. Terminals 131A and 131B are supplied with the required power from a circuit (not shown). A constant current circuit 112 produces a constant current from the inputted power and outputs it to a terminal 135A through a switching circuit 133. The terminal 135A is connected to the terminal 125A of FIG. Further, the terminal 125B of FIG. 21 is connected to a terminal 135B of FIG. 22. Further, a terminal 125C of FIG. 21 is connected to a terminal 135C of FIG. 22. Accordingly, the charging current for the battery 111 flows to a resistor 134 through the terminals 125B and 135B. This charging current is fed back to a circuit (not shown) from the terminal 131B.

A voltage detection circuit 136 detects the voltage across the terminals 135A and 135B and outputs a detection signal to a control circuit 138. The control circuit 138 is supplied with a detection signal indicative of a charging current through the resistor 134 detected by a current detecting circuit 137. The identification signal indicative of a battery charging exclusive charger and outputted from an exclusive charger signal generating circuit 139 is supplied to the protective operation control circuit 24 through the terminals 135C and 125C. A timer circuit 40 performs a time counting operation and supplies a time-counting information signal to the control circuit 138.

Figure 23:
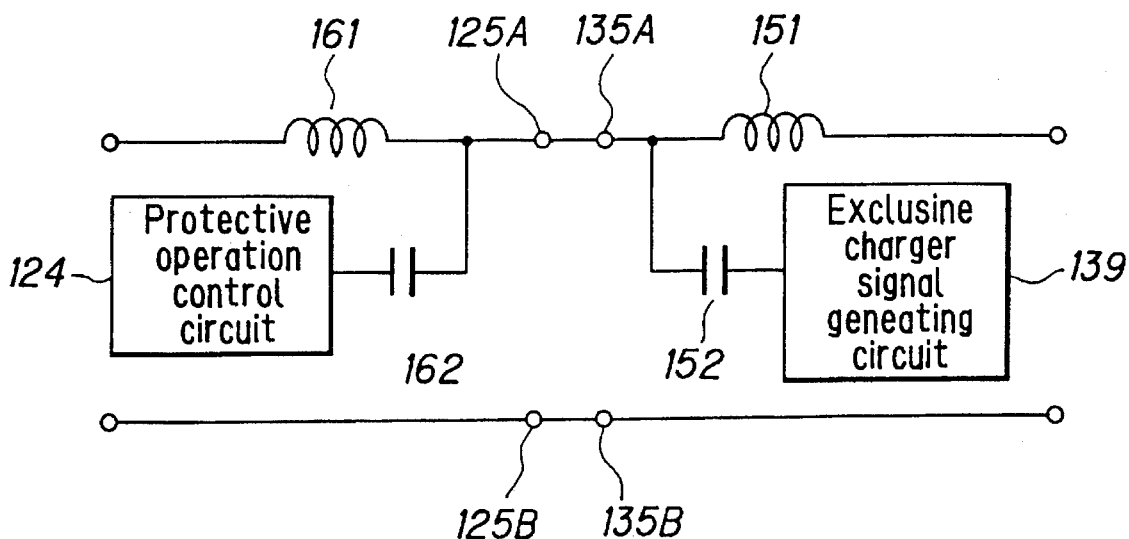
FIG. 23 is a block diagram of another example showing how an identification signal is transmitted according to the present invention.
Figure 24:
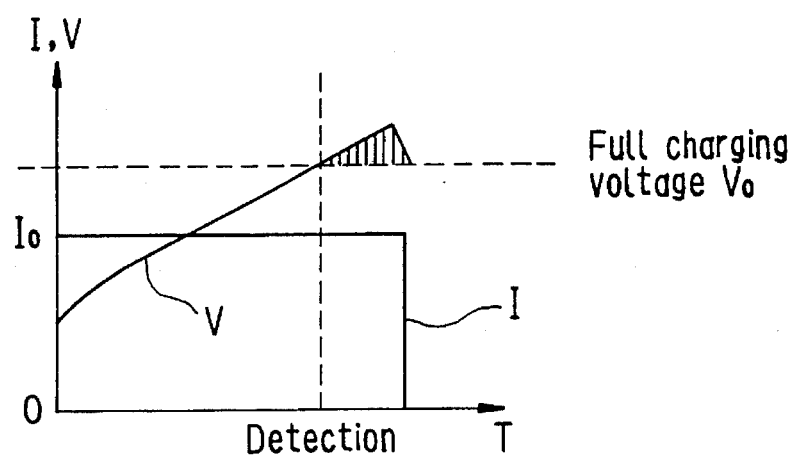
FIG. 24 is a diagram illustrating how the embodiment of FIG. 22 operates.

In the embodiments shown in FIGS. 21 and 22, there are provided the terminals 135C and 125C for supplying the identification signal from the exclusive charger signal generating circuit 139 to the protective operation control circuit 124 but these terminals may be omitted by using the circuit shown in FIG. 23. That is, in the embodiment shown in FIG. 23, the identification signal generated from the exclusive charger signal generating circuit 139 is outputted to the terminal 135A through a capacitor 152 and is then supplied to the protective operation control circuit 124 from the terminal 125A through a capacitor 162.

In the above case, the identification signal generated from the exclusive charger signal generating circuit 139 is a predetermined frequency sine wave or predetermined pattern pulse signal (AC signal). Coils 151 and 161 are adapted to control the identification signal (AC signal) in a way in which it does not affect the other circuits.

Next, the operation of the embodiment shown in FIG. 21 and 22 will be described. When the charger shown in FIG. 22 is connected to the battery pack shown in FIG. 21, the constant current generated from the constant current circuit 12 flows through the switching circuit 133, terminals 135A and 125A, battery 111, switching circuit 123, terminals 125B and 135B and resistor 134 in that order so that the battery 111 is charged with the constant current. Thus, when the charging with this constant current $I_0$ is initiated, the terminal voltage V of the battery 111 increases gradually.

The voltage detection circuit 122 detects the terminal voltage V of the battery 111 and when the detected voltage reaches a predetermined reference operating voltage (e.g. 4.35 V when the full charging voltage $V_0$ is 4.2 V), the detection signal from the circuit 122 is outputted to the switching circuit 123. In this case, the switching circuit 123 turns an overcharge protection switch (to be described later with reference to FIG. 28) OFF whereby the charging operation is stopped to prevent the battery from being broken due to an overcharge.

However, in the present embodiment, since the charger shown in FIG. 22 is of the type that is exclusively used for the battery pack shown in FIG. 21, it is so designed in advance that the terminal voltage of the battery 111 does not increase until it reaches a breakdown voltage. Therefore, when the protective operation control circuit 124 has detected the identification signal generated from the exclusive charger signal generating circuit 139 from the signal supplied from the terminal 125C, it controls the voltage detection circuit 122 so that the ON-OFF operation of the overcharge protective switch of the switching circuit 123 is inhibited (i.e. inhibition of protective operation) whereby the charging of the battery is prevented from interruption due to the operation of the overcharge protection circuit.

Further, the voltage detection circuit 136 of the charger detects the voltage across the terminals 135A and 135B (the terminal voltage of the battery 111) and when this voltage reaches a full charging voltage $V_0$, outputs the detected signal to the control circuit 138 which then causes the switching circuit 133 to turn ON and OFF periodically allowing the constant current from the constant current circuit 112 to be intermittently supplied to the battery 111. A timer circuit 140 counts the time lapsed in this case.

Figure 25:
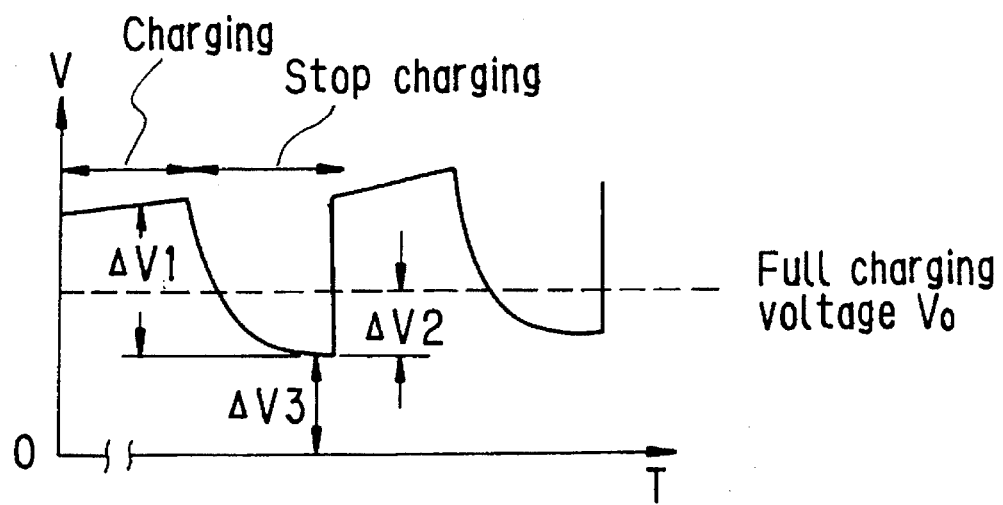
FIG. 25 is an enlarged diagram of a part of FIG. 24.

FIG. 25 shows a variation of the terminal voltage V of the battery 111 when the charging with the above constant current is intermittently performed. As shown in this figure, the terminal voltage V of the battery 111 gradually increases while the charging with the constant current is performed. However, when the charging operation is stopped, the terminal voltage V of the battery drops gradually as the chemical change taking place within the battery is stabilized and after a lapse of a predetermined period of time, the voltage is substantially stabilized at a certain value. The voltage detection circuit 136 detects at least either any one of three voltages, i.e. the stabilized voltage $\Delta V_3$ while the charging operation is stopped, the difference voltage $\Delta V_1$ between the terminal voltage during the charging period and the voltage $\Delta V_3$ or the difference voltage $\Delta V_2$ between the voltage $\Delta V_3$ and the full charging voltage $V_0$.

The voltage $\Delta V_1$ fluctuates scatters depending on the time of charging of the battery 111 but the voltages $\Delta V_2$ and $\Delta V_3$ vary slowly. If the charging operation with the constant current is performed and stopped repeatedly in an alternative fashion, the voltage $\Delta V_3$ gradually approaches the full charging voltage $V_0$ and the voltage $\Delta V_2$ gradually approaches zero. Therefore, the control circuit 138 monitors, for example, the voltages $\Delta V_2$ and $\Delta V_3$ and when the voltage $\Delta V_2$ becomes zero or thereabouts, or the voltage $\Delta V_3$ becomes equal to the full charging voltage $V_0$ or thereabouts, or the above two conditions are satisfied, the switching circuit 133 is controlled to stop the supply of the constant current from the constant current circuit 112 on the assumption that the battery has been properly charged, to thereby terminating the charging operation for the battery 111. In this case, it is of course possible to terminate the charging operation by making use of the condition in which the voltage $\Delta V_1$ has reached a predetermined value.

Figure 26:
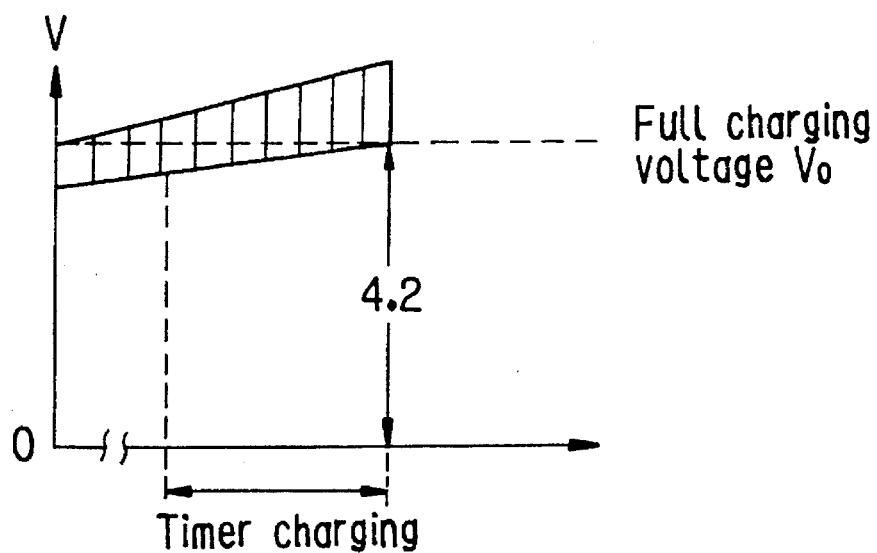
FIG. 26 is a diagram illustrating how the embodiment of FIG. 22 operates when a charging operation is performed with the use of a timer.
Figure 27:
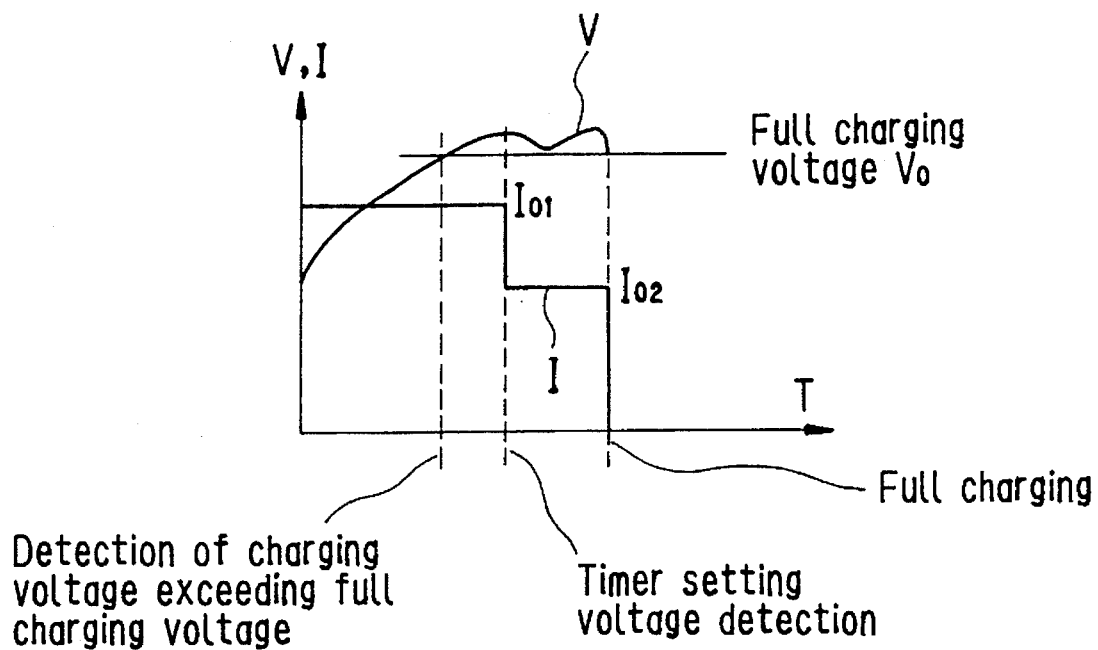
FIG. 27 is a diagram illustrating how the embodiment of FIG. 22 operates when the charging current is varied.

Further, it is also possible to terminate the charging operation in the following manner. That is, when, for example, the voltage $\Delta V_2$ or the difference between the voltage $\Delta V_3$ and the voltage $V_0$ becomes low as it gradually approaches zero, it becomes difficult to detect it accurately. Therefore, when these voltages take predetermined values, respectively, the charging operation with the constant current circuit 112 is intermittently performed for a predetermined period of time and then terminated as shown in FIG. 26. Such predetermined period of time may be set up on the basis of a result of actual charging of the battery 111 by the exclusive charger. Thus, by setting up the predetermined period of time to a suitable length, it is possible to bring the battery 111 under just a fully charged state in good timing when the period of time has lapsed. (in the case of FIG. 26, the stabilized terminal voltage of the battery 111 at the time of terminating the charging operation may be set to 4.2 V). The time counting operation for the above purpose can be performed by the timer circuit 40.

In the above case, it is possible to make the value for a constant current $I_{o2}$ during the intermittent charging period different from the value for a constant current $I_{o1}$ during the period prior to the intermittent period (in the instant embodiment, $I_{o1} < I_{o2}$). In this case, the constant current 112 is controlled by the control circuit 138 to properly change the value for the outputting constant current.

It should be noted that although in the above-described embodiment the terminal voltage of the battery 111 is described to be detected by the voltage detection circuit 136, it is also possible to convert the charging current for the battery 111 flowing through the resistor 134 into a voltage, to detect the converted voltage by the current detection circuit 137 and to supply it to the control circuit 138. In this case, the voltage detection circuit 136 can be dispensed with. Alternatively, where the voltage detection circuit 136 is used, the resistor 134 and the current detection circuit 137 can be dispensed with.

Figure 28:
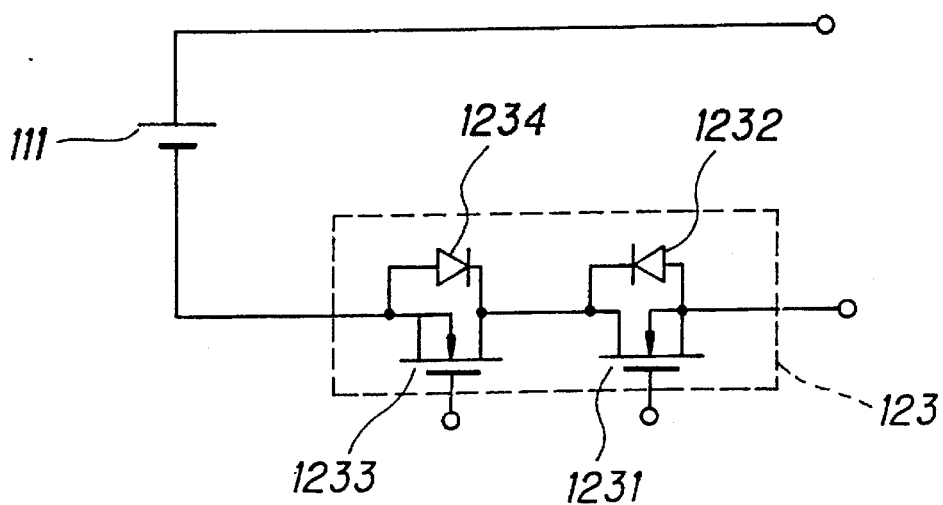
FIG. 28 is a circuit diagram illustrating a switch circuit of FIG. 21.

Next, the protective operation of the switching circuit 123 shown in FIG. 21 will be described in more detail. Referring to FIG. 28 which shows in detail how the switching circuit 123 is constructed, an overcharge protective switch of the circuit comprises a FET 1231 and an equivalent diode 1232 connected in parallel and a discharge protective switch of the circuit comprises a FET 1233 and an equivalent diode 1234 connected in parallel. FETS 1231 and 1233 turn ON and OFF in response to the output of the voltage detection circuit 122.

For example, when the battery 111 is charged in a normal state, the FETS 1231 and 1233 are both kept ON. Therefore, a charging current flows through the battery 111, FET 1233, equivalent diode 1234 and FET 1231 in that order. Further, when the voltage detection circuit 122 detects a voltage higher than a protective operation reference voltage, if the protective operation is not inhibited in response to the control signal from the protective operation control circuit 124, the FET 1231 is switched from ON to OFF. Since in this case the equivalent diode 1232 is connected reverse biased with respect to the charging current for the battery 111, if the FET 1231 is turned OFF, the charging current can not flow therethrough.

As a result, the battery 111 begins to discharge and the resultant discharge current flows through the diode 1232, FET 1233 and battery 111 in that order.

Figure 29:
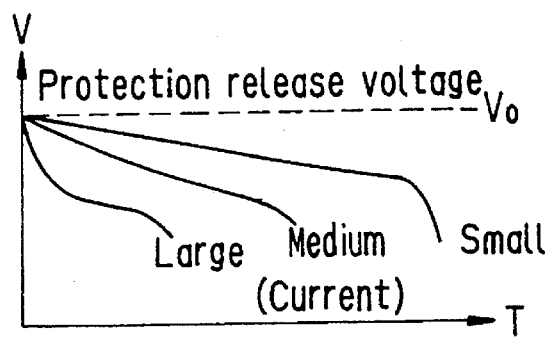
FIG. 29 is a diagram illustrating the discharge characteristic of the battery of FIG. 21.
Figure 30:
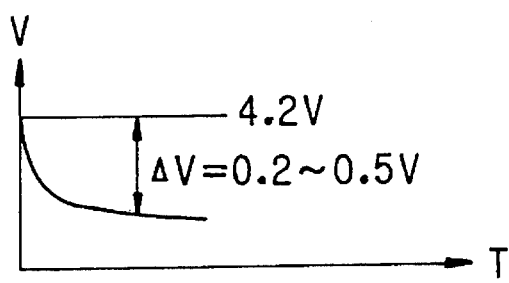
FIG. 30 is an enlarged diagram of a part of FIG. 29.

Now, where the discharge current is comparatively large as shown in FIG. 29, the voltage drop of the equivalent diode 1232 is in the order of about 0.6 V (where the FET 1231 is ON, it is in the order of about 0.03 V). As a result, the terminal voltage of the battery 111 drops to a considerable degree from the protective operation reference voltage (a reference voltage obtained as a result of the FET 1231 being switched from ON to OFF) as shown enlarged in FIG. 30. When this reference voltage is 4.2 V, for example, this dropping voltage ΔV will become about 0.2 to 0.5 V. Thus, since the terminal voltage of the battery 111 drops, the voltage detection circuit 122 causes the FET 1231 to be switched from ON to OFF again. That is, it releases the protective operation.

The power loss due to the equivalent diode 1232 increases in proportion to the length of time during which the FET 1231 is OFF. Therefore, in view of such power loss, it is desirable to keep the FET 1231 ON as long as possible. In the present embodiment, as the FET 1231 is always kept ON during the charging operation as described above, it is possible to control the increase in the power loss due to the diode 1232.

Figure 31:
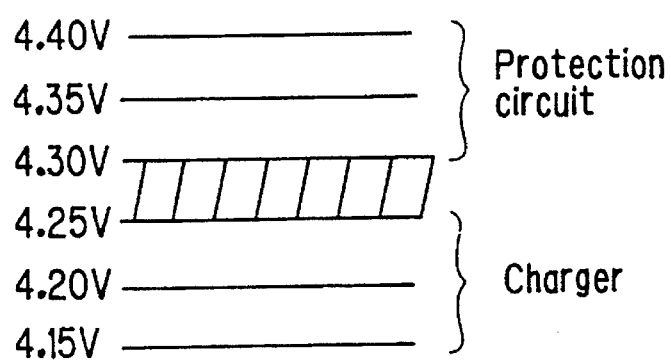
FIG. 31 is an illustration of a protective operation reference voltage for a charger without a protective operation control circuit 24 and for a protective circuit 21 in the embodiment shown in FIG. 21.

As shown in FIG. 31, when the full charging voltage of the charger is in the order of 4.2 V, the reference voltage with which the overcharge protective switch operates is set to a value, for example, 4.35 V which is higher than the full charging voltage. Supposing that each of the voltages has a scatter of ±0.5 V, the full charging voltage will be between 4.15 V and 4.40 V and the voltage with which the overcharge protective switch operates will be between 4.30 V and 4.40 V.

Where the protective operation control circuit 124 is not provided as in the case of the prior art charger, in order to prevent the protective circuit from operating immediately after charging by the charger, it is necessary to accurately set the operating voltage of the circuit to a value higher than the full charging voltage and smaller than 4.4 V which may break down the battery 111.

Figure 4:
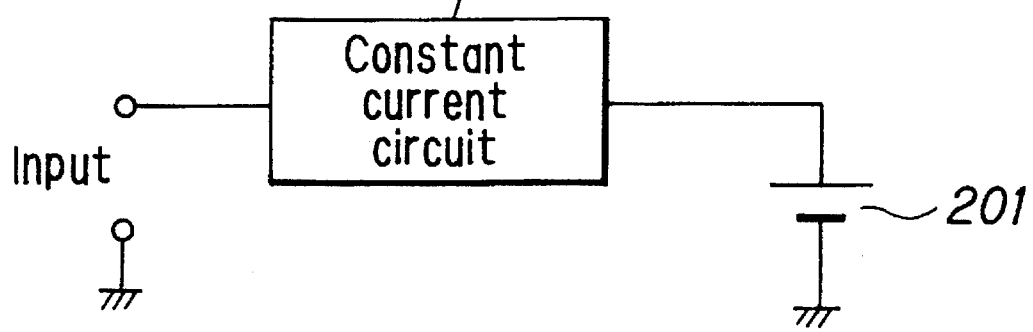
FIG. 4 is a block diagram of a second example of a conventional secondary battery charger.
Figure 5:
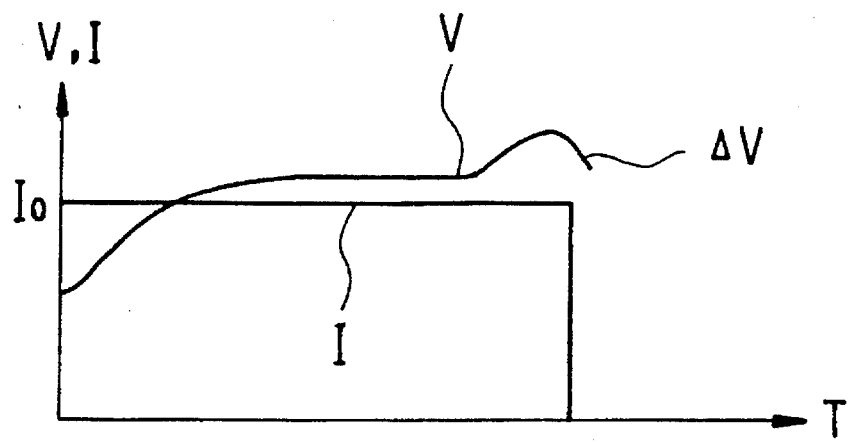
FIG. 5 is a diagram illustrating how the battery charger of FIG. 4 operates.
Figure 32:
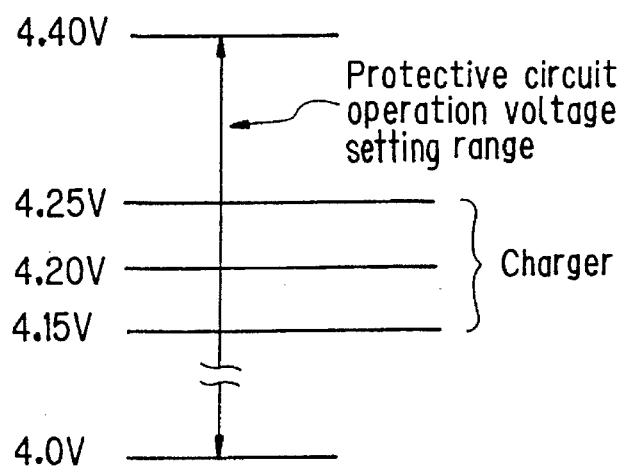
FIG. 32 is an illustration of relationship between the charging voltage of the charger and the protective operation reference voltage according to the embodiment of FIG. 31.

On the other hand, where an attempt is made to inhibit the overcharge protective operation at the time of battery charging as in the above-described embodiment, if the terminal voltage is higher than that breakdown voltage of 4.4 V, the protective operation is necessary but if therebelow, such operation is prohibited. Therefore, as shown in FIG. 32, it becomes possible to set the overcharge protective operation reference voltage either to a value of 4.4 V which is the operating voltage for protecting the battery 111 against breakdown or to a value, e.g. 4.0 V, which is lower than 4.2 V indicating the full charging voltage. In other words, it is possible to normally operate the protective circuit 121 even when the reference voltage for operating the circuit scatters to a great degree.

Where the battery shown in FIG. 21 is charged by a general charger instead of the exclusive charger shown in FIG. 22, no identification signal is inputted to the protective operation control circuit 124. As a result, the protective operation of the protective circuit 121 can not be inhibited. However, as already described, the charger in such a case is constructed as shown in FIG. 4 in which a constant current charging is performed for a predetermined period of time and then it is switched to a constant voltage charging, so that the battery 111 can be charged without being broken.

(9) Embodiment 9

Figure 33:
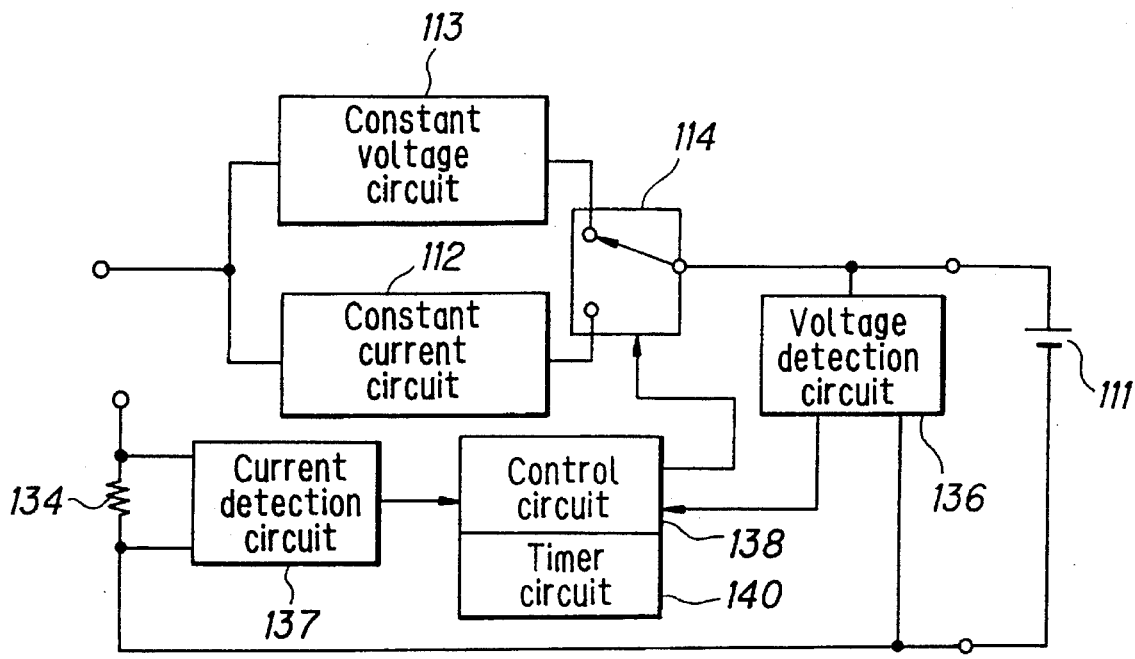
FIG. 33 is a block diagram of a secondary battery charger according to a ninth embodiment of the present invention.

FIG. 33 shows a charger according to a ninth embodiment of the present invention. It should be noted that although the exclusive charger signal generating circuit 139 and the protective operation control circuit 124 appearing in FIGS. 22 and 21 are omitted in this figure, these are provided in this embodiment, too.

Figure 6:
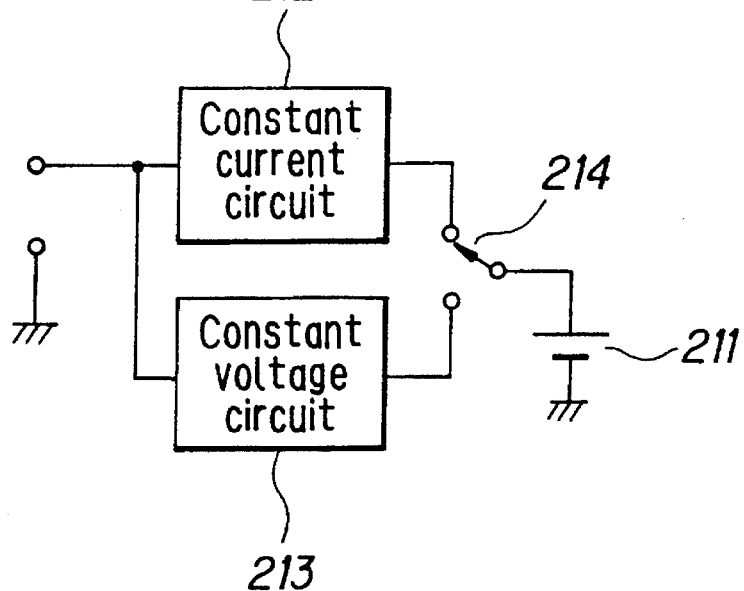
FIG. 6 is a block diagram of a third example of a conventional secondary battery charger.

In the present embodiment, the constant current circuit 112 and the constant voltage circuit 113 are connected parallel with each other and one of the outputs of these circuits is selected by the switch 114 so as to be supplied to the battery 111 as in the case of the embodiment shown in FIG. 6. Further, the charging voltage (terminal voltage) of the battery 111 is detected by the voltage detection circuit 136 and the detected result (detection signal) is outputted to the control circuit 138. Further, the charging current flowing through the resistor 134 is detected by the current detection circuit 137 and the detected current is supplied to the control circuit 138 which then changes over the switch 114 in response to these inputs.

Figure 34:
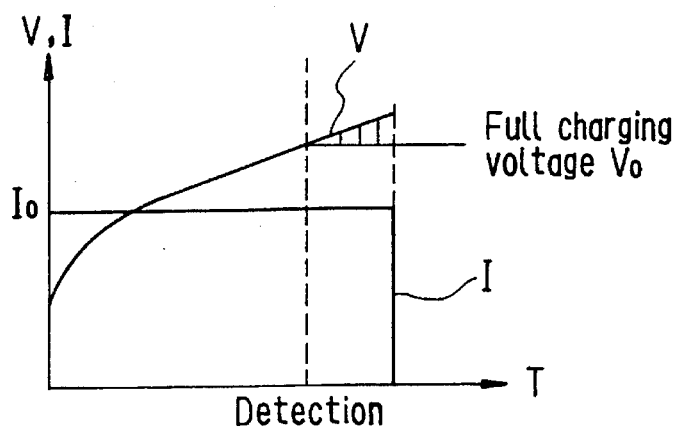
FIG. 34 is a diagram illustrating how the charger according to the ninth embodiment of FIG. 33 operates.

Next, the operation of the charger will be described. At the time of initiating a charging operation, the control circuit 138 turns the switch 114 toward the constant current circuit 112 whereupon the constant current outputted from the constant current circuit 112 flows through the switch 114, battery 111 and resistor 134 in that order. The terminal voltage V of the battery 111 gradually increases as shown in FIG. 34 as the charging with the constant current progresses. The voltage detection circuit 136 monitors the terminal voltage of the battery 111 and when the terminal voltage reaches the full charging voltage $V_0$, it outputs a signal to the control circuit 138. Then the control circuit 138 causes the timer 140 belonging thereto to start a time counting operation and allows the constant current charging operation to continue until a predetermined period of time is counted.

Figure 35:
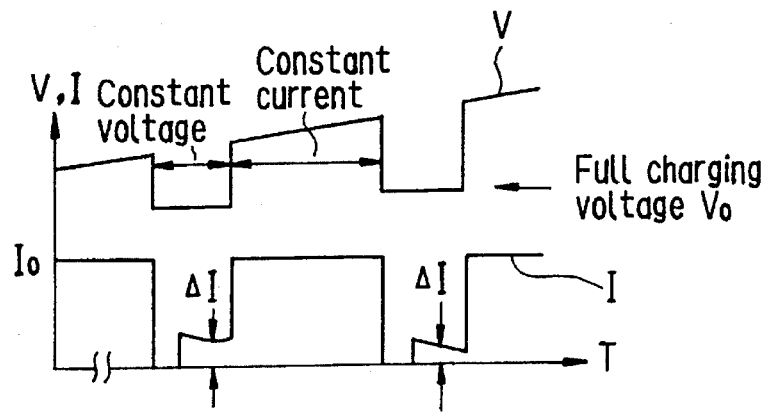
FIG. 35 is an enlarged diagram of a part of FIG. 34.

Thus, after a lapse of a predetermined period of time, the control circuit 138 turns the switch 114 toward the constant voltage circuit 113 as shown in FIG. 35 whereby the full charging voltage $V_0$ outputted from the constant voltage circuit 113 is applied on the battery 111 to start a constant voltage operation. With the constant voltage charging operation, the charging current gradually decreases because of an increase in the internal impedance of the battery 111 as described above. The current detection circuit 137 coverts the charging current through the resistor 134 into a voltage and detects the voltage so as to output a detecting signal to the control circuit 138. The control circuit 138 compares the charging current $\Delta I$ during the constant voltage charging with a predetermined reference current and when the charging current is larger than a reference value, the timer 140 turns the switch 114 from the constant voltage circuit 113 to the constant current circuit 112 again thereby restarting a constant current charging operation.

Figure 36:
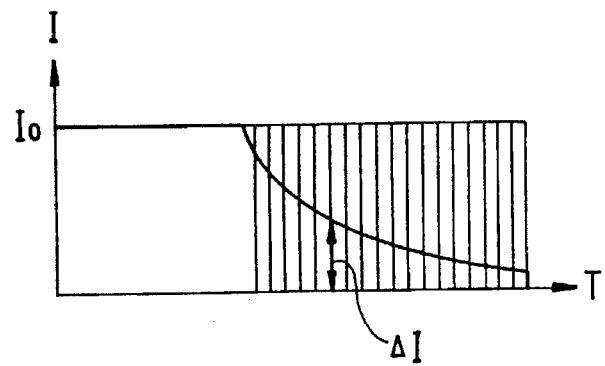
FIG. 36 is a graph showing a constant current variation with time in the embodiment of FIG. 33.

Thus, when both the constant current and voltage charging operations are performed in an alternative fashion every predetermined period of time and the value for the charging current $\Delta I$ is equal to, or smaller than, the reference value, the control circuit 138 causes the switch 114 to assume its neutral position thereby terminating the charging operations. That is, in the present embodiment, the charging current during a charging operation takes a constant value of $I_0$ if the charging operation is performed with a constant current but during alternate constant current and voltage charging operations, the charging current becomes $I_0$ or $\Delta I$ as shown in FIG. 36 and as the value of $\Delta I$ decreases gradually with the progress of charging, the charging operations terminate when the $\Delta I$ takes a predetermined value.

Thus, when the constant current and voltage charging operations are switched in an alternative fashion, the charging voltage V on the battery 111 does not increase as much as when the battery is charged with the constant current only and further, the battery 111 can be charged faster than when it is charged with the constant voltage only.

Further, even in the present embodiment, it is possible to allow the charger to operate such that the timer circuit 40 is operated when the current $\Delta I$ takes less than a predetermine value and after performing a constant current or voltage charging operation for a certain period of time, the charging operation is terminated.

Moreover, it is also possible to allow the charger to operate such that when the terminal voltage of the battery 111 reaches the full charging voltage $V_0$ while a constant current charging operation is performed, the operation is immediately switched to a constant voltage charging operation without allowing the constant current charging operation to be continued for a predetermined period of time.

(10) Embodiment 10

Figure 37:
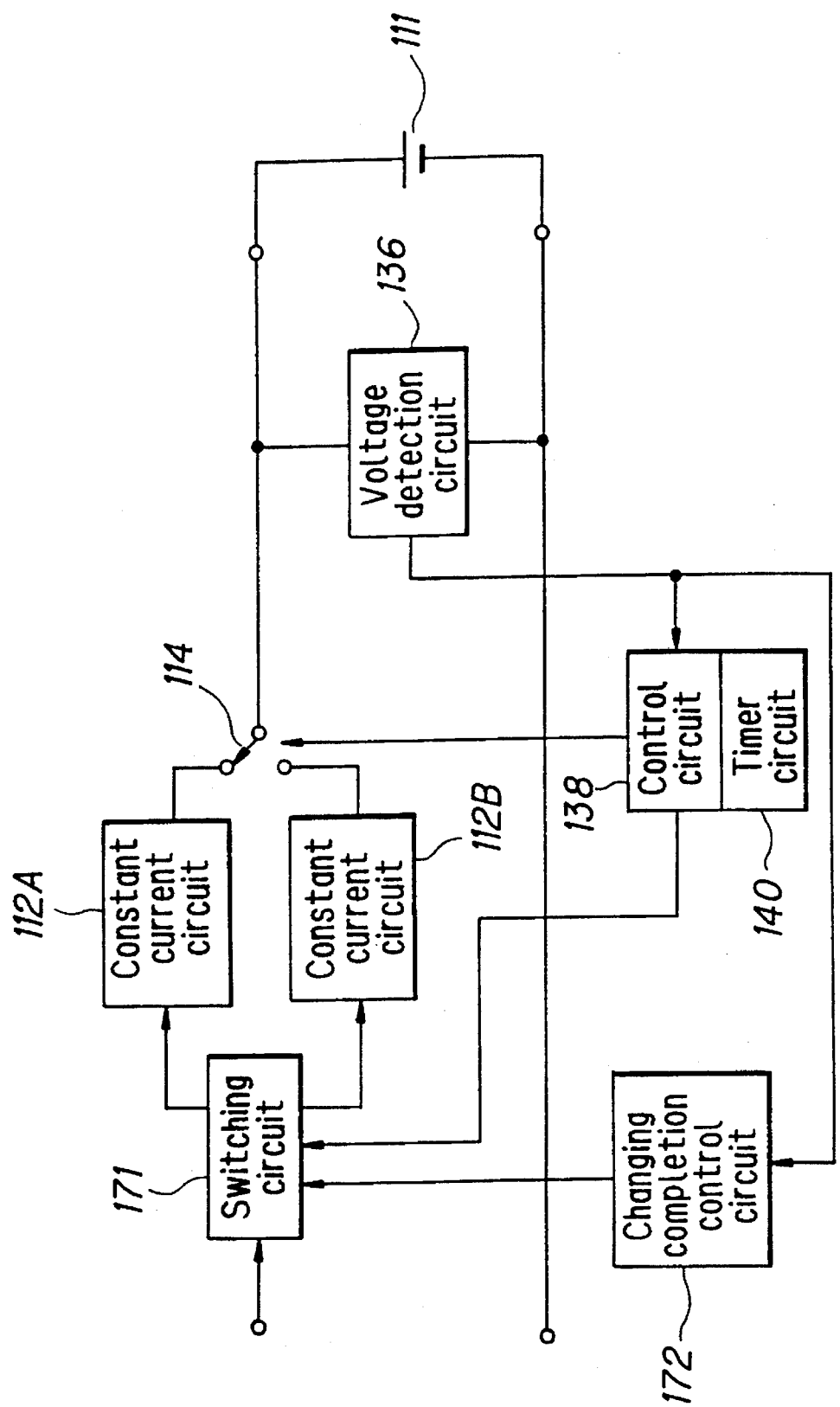
FIG. 37 is a block diagram of a secondary battery charger according to a tenth embodiment of the present invention.

FIG. 37 shows a charger according to a tenth embodiment of the present invention. In the present embodiment, the constant current circuit 112 is divided into constant current circuits 112A and 112B to which the required power is supplied through a switching circuit 171. The constant current circuits 112A and 112B are so formed as to generate constant currents of different values, respectively. Further, both circuits are selected by the switch 114 to charge the battery 111.

The voltage detection circuit 136 detects the terminal voltage of the battery 111 and outputs the detected voltage to the control circuit 138 and a charge completion control circuit 172. The control circuit 138 controls the switch 114 and the switching circuit 171. The charge completion control circuit 172 controls the switching circuit 171.

That is to say, in the present embodiment, at the initial stage of charging, the switch 114 is turned upward in the drawing and the constant current $I_{01}$ is outputted from the constant current circuit 112A thereby charging the battery 111. The voltage detection circuit 136 detects the terminal voltage of the battery 111 and when the terminal voltage is found to have reached the full charging voltage $V_0$, the circuit 136 outputs a detection signal to the control circuit 138 whereupon the control circuit 138 causes the timer circuit 140 to start a time counting operation and allows the charging operation with the constant current $I_{01}$ until a predetermined period of time lapses.

Then, after a lapse of the predetermined period of time, the control circuit 138 turns the switch 114 downward in the drawing so that a constant current $I_{02}$ from the constant current circuit 112B is selected. This constant current $I_{02}$ is set to a value smaller than that of the constant current $I_{01}$. Since the value of the constant current for charging the battery 111 is switched from $I_{01}$ to $I_{02}$, the terminal voltage of the battery 111 drops once when the current is switched and then increases again as the charging with the constant current $I_{02}$ is performed. However, the rate of increase is small as compared to that in a case where charging is performed with the constant current $I_{01}$.

When the timer circuit 140 has counted a predetermined period of time after the charging operation with the constant current $I_{02}$ is initiated, the control circuit 138 controls the switching circuit 171 to thereby complete the charging operation. Alternatively, it is possible to complete the charging operation in such a manner that when the terminal voltage of the battery 111 reaches a predetermined value in response to the voltage detected by the voltage detection circuit 136, the charge completion control circuit 172 detects it to control the switching circuit 171.

Figure 39:
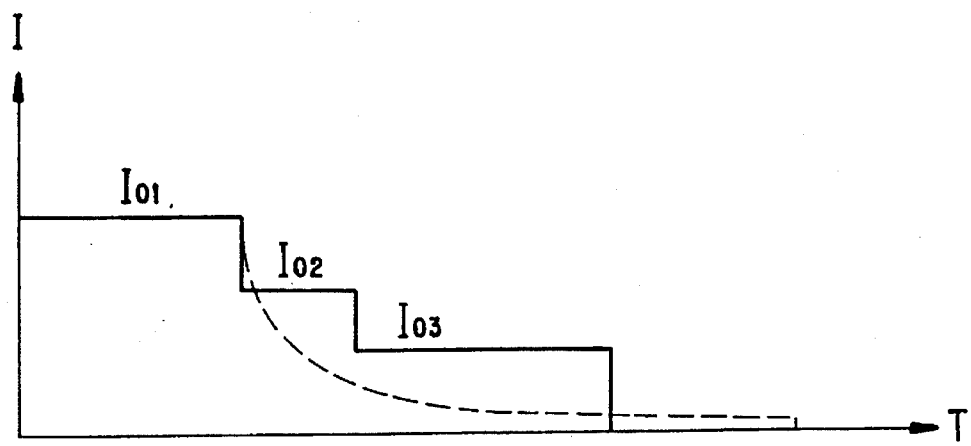
FIG. 39 is a diagram illustrating how the charger of the embodiment of FIG. 37 operates.

In the present embodiment, the constant current is made to be switched between two stages but it is possible to make it switchable among three stages as shown in FIG. 39. Further, it is enough for the value of the constant current outputted after such switching to become gradually smaller in average so that the value may momentarily be larger in the earlier stage than the later stage with respect to time. In addition, in the embodiment of FIG. 39, the battery charging times by using the constant currents $I_{01}$ through $I_{03}$ are different from each other but the same charging time may be used with each of the constant currents.

(11) Embodiment 11

Figure 40:
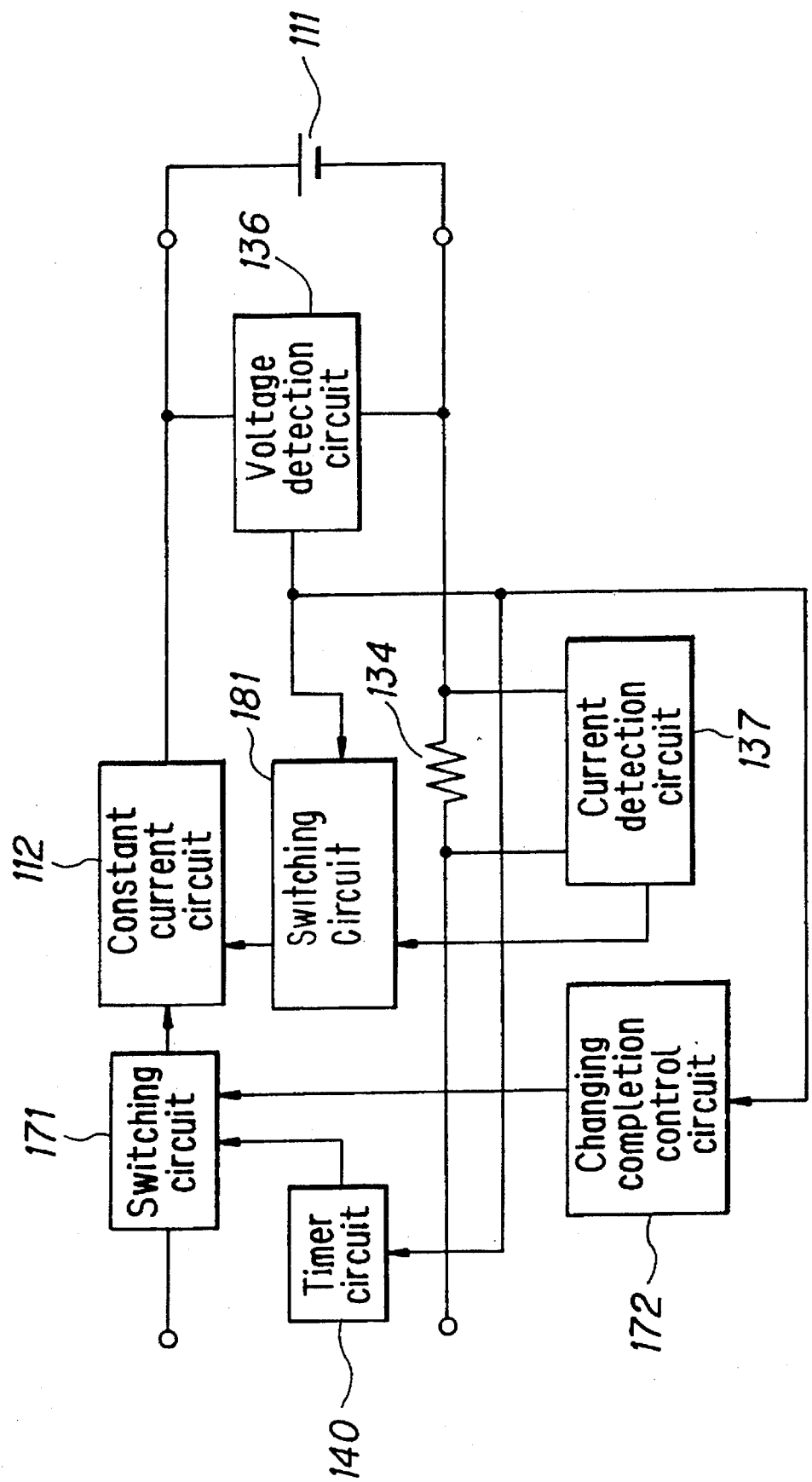
FIG. 40 is a block diagram of a secondary battery charger according to an eleventh embodiment of the present invention.

FIG. 40 shows an eleventh embodiment of the present invention. In the present embodiment, there is only one constant current circuit 112 and power is supplied to this circuit through the switching circuit 171. Further, the battery 111 is charged with the constant current outputted from the constant current circuit 112 and the charging current is detected by the current detection circuit 137 through the resistor 134. Then the output of the circuit 137 is supplied to a current switching circuit 181 to which is also supplied a result of buttery voltage detection outputted from the voltage detection circuit 136.

The current switching circuit 181 is so formed as to switch the current characteristic of the constant current circuit 112 in response to the inputs it receives. Further, the output of the voltage detection circuit 136 is supplied to the charge completion control circuit 172 and the timer 140. The switching circuit 171 is controlled in response to the outputs of the charge completion control circuit 172 and the timer circuit 140.

That is, in the present embodiment, the constant current circuit 112 outputs, for example, the constant current $I_{01}$ at the time of initiation of charging and the battery 111 is charged with this constant current $I_{01}$. When the voltage detection circuit 136 detects that the terminal voltage of the battery 111 has reached the full charging voltage $V_0$, it outputs a detection signal to the current switching circuit 181. Then, in response to this detection signal, the current switching circuit 181 switches the constant current from the constant current circuit 112 from, for example, $I_{01}$ to $I_{02}$. The timer circuit 140 starts a counting operation from when the constant current value switching is made and when a predetermined period of time is counted by the circuit 140, the switching circuit 171 is controlled to stop the charging operation.

Alternatively, it is possible to form the charger such that when the voltage detection circuit 136 detects that the terminal voltage of the battery 111 has reached a predetermined value, the charging completion control circuit 172 controls the switching circuit 171 in response thereto thereby terminating the charging operation.

Further, the terminal voltage of the battery 111 can also be detected in such a manner that the charging current for the battery 111 is detected by the current detection circuit 137 through the resistor 134, instead of detecting it by the voltage detection circuit 136. In this case, the current switching circuit 181 controls the constant current circuit 112 in response to the detecting output of the current detection circuit 137.

Figure 38:
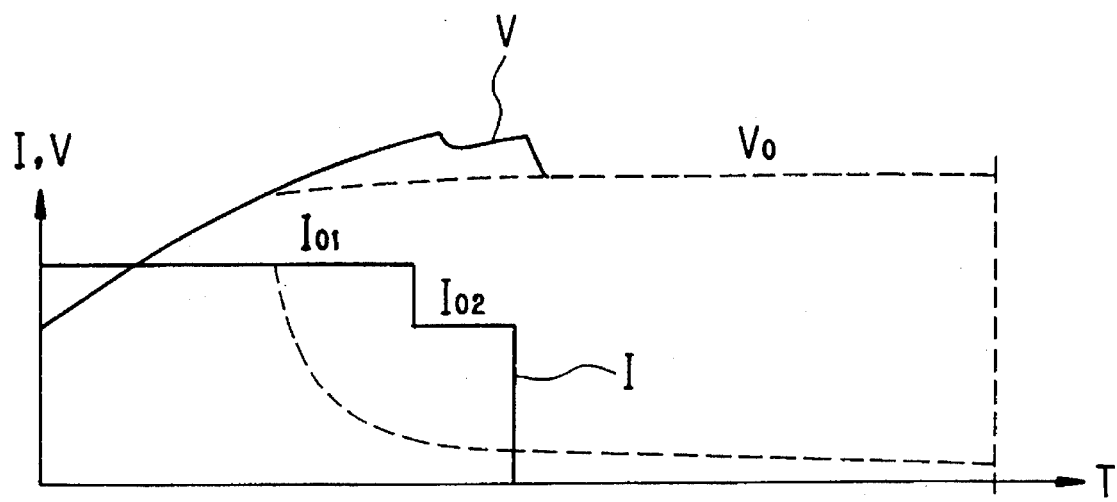
FIG. 38 is a diagram illustrating how the charger of the embodiment of FIG. 37 operates.

Thus it is also possible with the present embodiment to perform the battery charging operation shown in FIGS. 38 or 39.

(12) Embodiment 12

Figure 41:
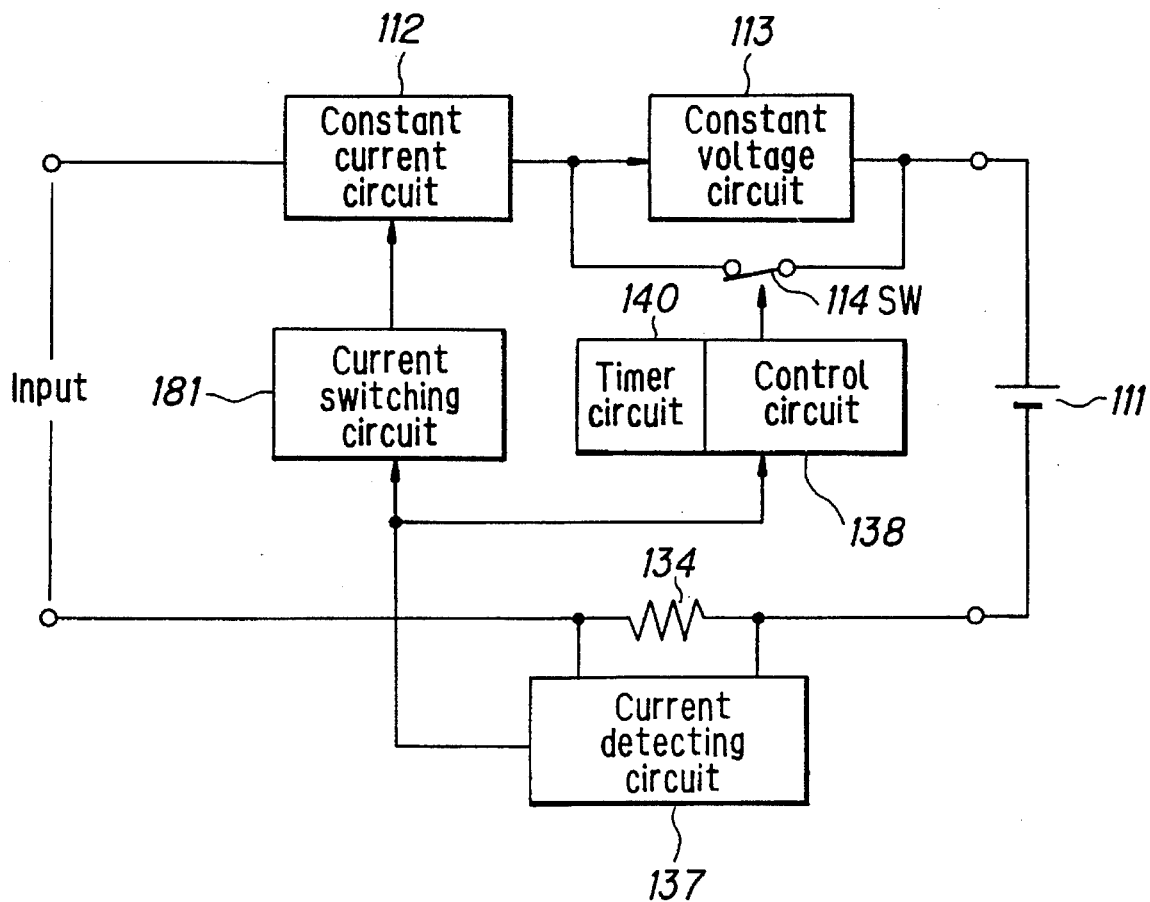
FIG. 41 is a block diagram of a secondary battery charger according to a twelfth embodiment of the present invention.

FIG. 41 shows a still further embodiment of the present invention wherein the constant current circuit 112 and the constant voltage circuit 113 are connected in series with each other for charging the battery 111 and the switch 114 is connected parallel to the constant voltage circuit 113. The charging current for the battery 111 is detected by the current detection circuit 137 through the resistor 134 and this detected output is supplied to the current switching circuit 181 and the control circuit 138. The current switching circuit 181 controls the constant current circuit 112 while the control circuit 138 controls the switch 114.

That is, in the present embodiment, the switch 114 is turned OFF by the control circuit 138 at the time of initiation of charging and as a result, the battery 111 is charged through a series circuit of the constant current circuit 112 and the constant voltage circuit 113. Since the internal impedance of the battery 111 is small at the time of initiation of charging, a constant current flows through the battery 111. In other words, a constant current charging operation is performed.

The control circuit 138 monitors the charging current flowing through the resistor 134, via the current detection circuit 137. When the internal impedance of the battery 111 increases with the progress of charging, the charging current gradually becomes smaller than the constant current $I_0$ from the constant current circuit 112. Thus, when the charging current has actually become smaller than the constant current $I_0$, the control circuit 138 turns the switch 114 ON to substantially inhibits the operation of the constant voltage 113 and as a result, the a battery 111 is again charged with the constant current $I_0$ from the constant current circuit 112. In this case, the control circuit 138 also causes the timer circuit 140 to initiate a time counting operation and after a lapse of a predetermined period of time, the switch 114 is again turned OFF to allow a charging operation by both the constant current and voltage circuits 112 and 113 to be performed for a predetermined period of time.

Figure 7:
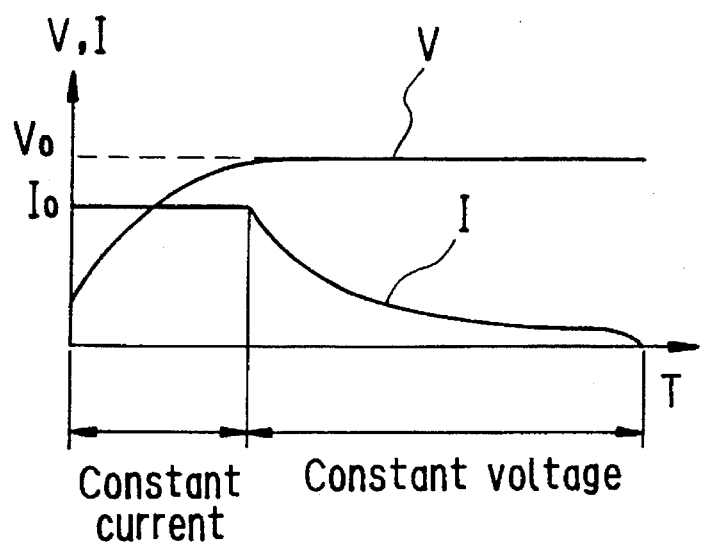
FIG. 7 is a diagram illustrating how the charger of FIG. 6 operates.

Thus the switch 114 is turned ON or OFF every predetermined period of time and when the switch 114 is in its OFF state, the charging characteristic of the battery 111 becomes the same as the shown in FIG. 7. That is, instead of the arrangement in which the constant current circuit 112 and the constant voltage circuit 113 are connected parallel to each other as shown in FIG. 6 for switching by the switch 114, even when the two circuits are connected in series with each other, the constant current charging and the constant voltage charging are substantially automatically switched in response to the variation of the internal impedance of the battery resulting from the charging of the battery.

The constant current charging is performed In the initial period of charging in which the internal impedance of the battery is small and the constant voltage charging is performed in the later period of charging in which the internal impedance of the battery is large.

The control circuit 138 detects, through the current detection circuit 137, the charging current in a state in which the switch 114 is OFF. That is, with the progress of charging of the battery 111, the charging current in the OFF-period of the switch 114 (the constant voltage charging state) gradually decreases. Then, when the charging current reaches a predetermined value, the charging operation is terminated by, for example, grounding the switch 114. Thus, the charging operation can be performed in the same manner as in the embodiment shown in FIGS. 34 through 36.

Figure 42:
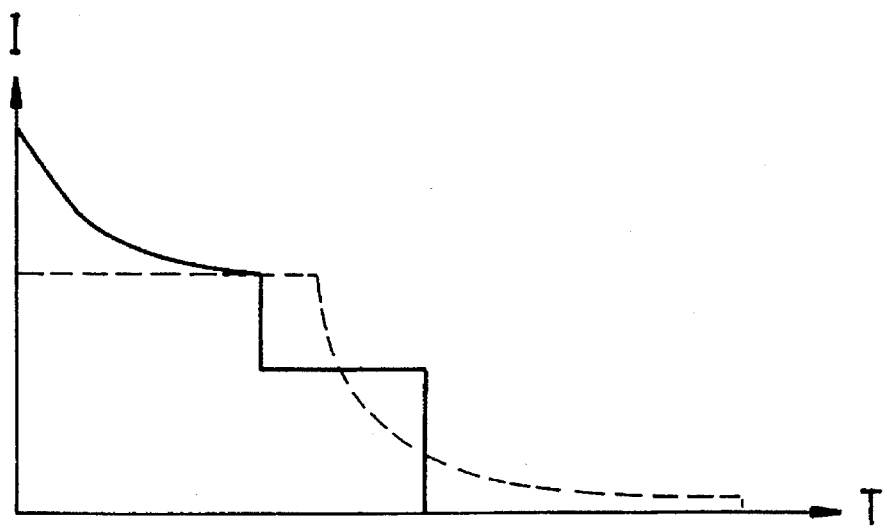
FIG. 42 is a diagram illustrating how the battery charger of the embodiment of FIG. 41 operates.
Figure 43:
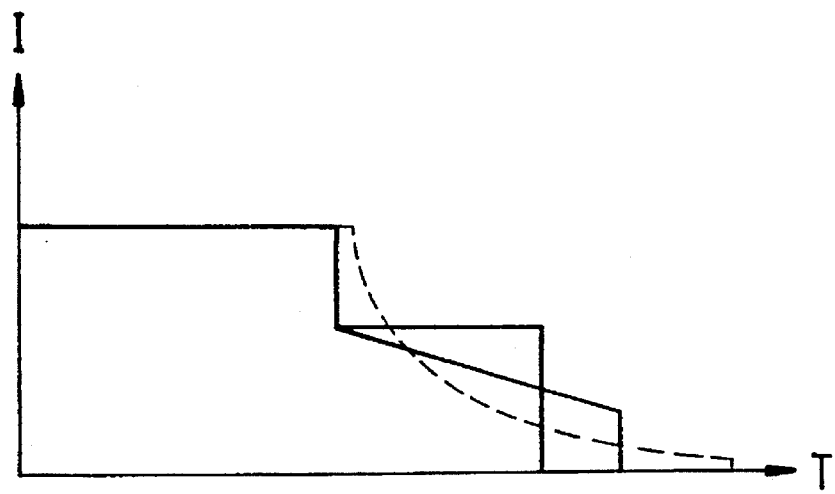
FIG. 43 is a diagram illustrating another operation of the battery charger of the embodiment of FIG. 42.

Further, the constant current at the time when the switch 114 is ON (the constant current charging) may be varied to take a predetermined value as shown in FIG. 42 or 43, for example, by controlling the constant current outputted from the constant current circuit 112 to the predetermined value. In the embodiment shown in FIG. 42, the charging current gradually decreases with a lapse of time in the initial period of charging but in the later period of charging, it has a small constant value. In the embodiment shown in FIG. 23, the charging current is constant in the initial charging period but in the later charging period, it takes a smaller constant value or tends to gradually decrease.

By the way, it should be noted that the constant current circuit 112 and the constant voltage circuit 113 are so controlled that they do not break down the battery 111.

Figure 44:
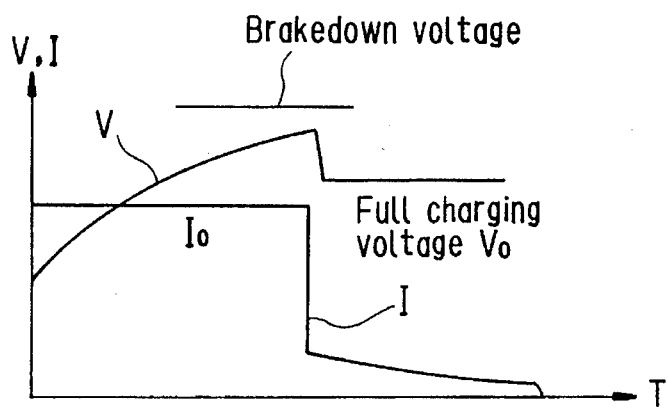
FIG. 44 is a diagram illustrating a still another operation of the battery charger of the embodiment of FIG. 43.

Further, as shown in FIG. 44, the charger may be so constructed that the battery 111 is charged with a constant current in the initial period of charging and such charging is allowed to continue until the terminal voltage of the battery 111 reaches a predetermined value which is larger than the full charging voltage $V_0$ but smaller than the breakdown voltage of the battery but immediately before the terminal voltage reaches the breakdown voltage, the charging is switched to a constant voltage charging using the full charging voltage $V_0$.

Figure 45:
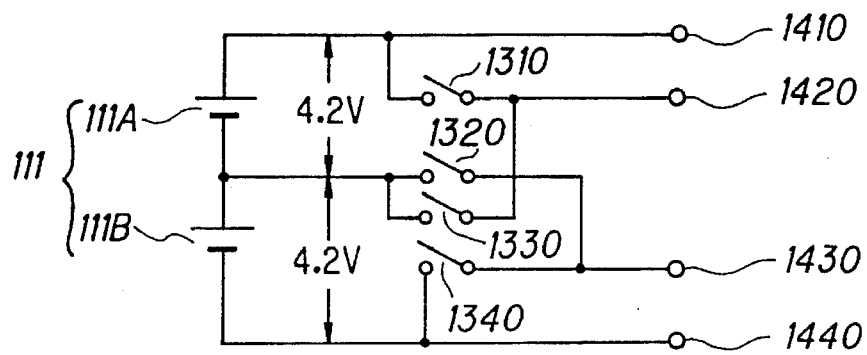
FIG. 45 is a circuit diagram for charging a plurality of batteries.

FIG. 45 shows a charger circuit structure in which when the battery 111 comprises two battery cells 111A and 111B connected in series with each other, the two cells can be charged simultaneously or separately. In this embodiment, the positive side of the battery cell 111A is connected to a terminal 1410 and to a terminal 1420 through a switch 1310. Further, the negative side of the battery cell 11A (the positive side of the battery cell 111B) is connected to terminal 1430 through a switch 1320 and to the terminal 1420 through a switch 1330. In addition, the negative side of the battery cell 111B is connected to a terminal 1440 and to the terminal 1430 through a switch 1340.

Figure 46:
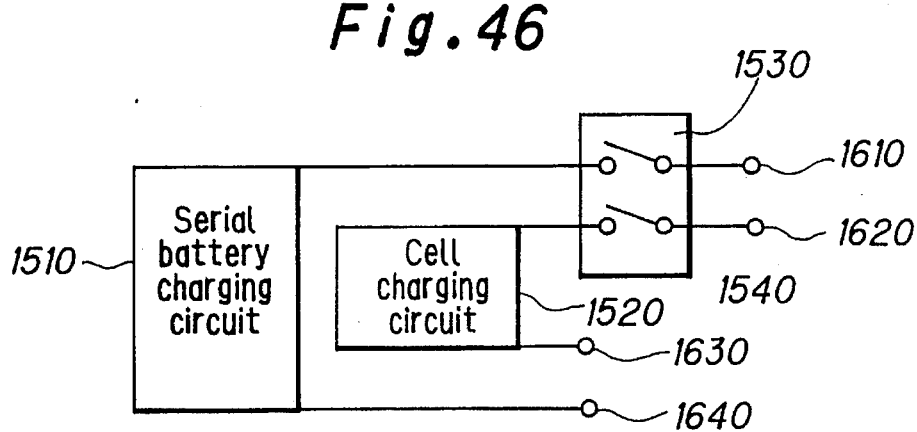
FIG. 46 is a circuit diagram for charging the batteries shown in FIG. 45.

A charger for charging the above-mentioned battery 111 is constructed as shown in FIG. 46. In this embodiment, there are provided a serial battery charging circuit 1510 and a cell charging circuit 1520 with one of the output terminals (positive side) of the circuit 1510 being connected to a terminal 1610 through a switch 1530. Further, one of the output terminals (positive side) of the circuit 1520 is connected to a terminal 1620 through a switch 1540. The other output terminals (negative side) of both the circuits 1510 and 1520 are respectively connected to terminals 1640 and 1630.

Where the battery shown in FIG. 45 is charged by the charger shown in FIG. 46, the terminals 1410 through 1440 are connected to the terminals 1610 through 1640, respectively. Further, where the battery cells 111A and 111B are charged simultaneously, the switches 1310 through 1340 are all turned OFF with only the switch 1530 being turned ON whereby the battery cells 111A and 111B are charged through the serial battery charging circuit 1510, switch 1530, terminals 1610 and 1410, battery cells 111A and 111B and terminals 1440 and 1640 in that order.

Where the battery cell 111A is charged, the switches 1540, 1310 and 1320 are turned ON so that the battery cell 111A is charged through the cell charging circuit 1520, switch 1540, terminals 1620 and 1420, switch 1310, battery cell 111A, switch 1320 and terminals 1430 and 1630 in that order.

On the other hand, where the battery cell 111B is charged, the switches 1540, 1330 and 1340 are turned ON and the battery cell 111B is charged through the cell charging circuit 152, switch 1540, terminals 1620 and 1420, switch 1330, battery cell 111B, switch 1340 and terminals 1430 and 1630 in that order.

Figure 47:
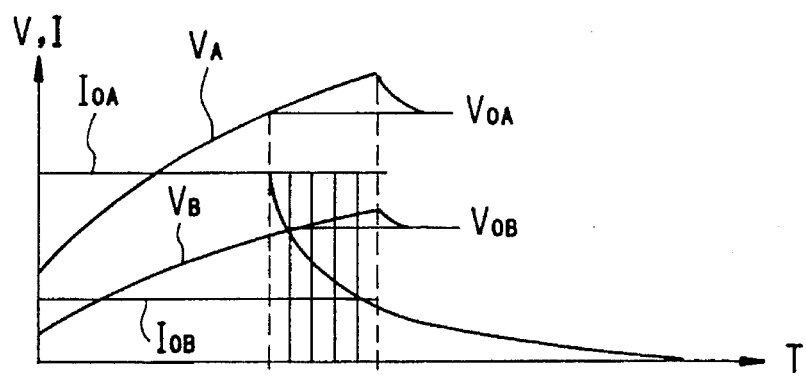
FIG. 47 is a diagram illustrating how the charger of FIGS. 45 and 46 operates.

The embodiments shown in FIGS. 45 and 46 may correspond to the chargers described hereinabove. In this case, as shown in FIG. 47, where the battery cells 111A and 111B are charged simultaneously, they are charged with a constant current $I_{OA}$ for a predetermined period of time. The terminal voltage $V_A$ of the battery 111 increases gradually in this case and when the full charging voltage $V_{OA}$ is reached, a switching operation (intermittent charging operation) similar to those in the abovedescribed embodiments is performed.

In FIG. 47, the constant current when either the battery cell 111A or 111B is charged by the cell charging circuit 1520 will be $I_{OB}$, the terminal voltage will be $V_B$ and the full charging voltage will be $V^{OB}$ and in this case, too, the switching operation of the charger is performed as in the case of charging the battery cells 111A and 111B. Further, the voltage detection circuit 122 can detect the terminal voltages of the battery cells 111A and 111B separately in this case.

Figure 48:
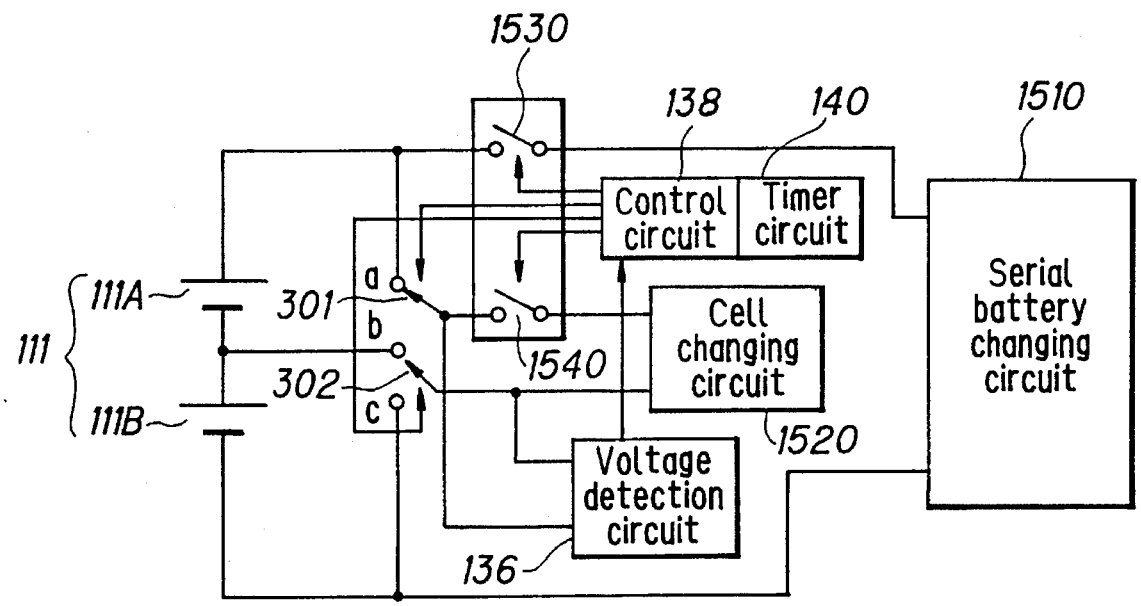
FIG. 48 is a block diagram of a circuit for charging a plurality of batteries.

FIG. 48 shows another embodiment for charging two battery cells 111A and 111B which are connected in series with each other. As shown, the output of the serial battery charging circuit 1510 is supplied to the battery cells 111A and 111B through the switch 1530. Further, one of the output terminals of the cell charging circuit 1520 is connected to a switch 301 through the switch 1540. The other output terminal of the cell charging circuit 1520 is connected to a switch 302. The voltage detection circuit 136 detects the voltage across the switches 301 and 302 and the detected voltage is outputted to the control circuit 138 which is adapted to control the switching operation between the switches 1530 and 1540 and that between the switches 301 and 302.

In the present embodiment, the control circuit 138 turns the switch 1530 ON at the time of initiation of charging whereby the charging current outputted from the serial battery charging circuit 151 is supplied to the battery cells 111A and 111B through the switch 1530 for charging them. In this case, the control circuit 138 turns the switch 301 to the contact "a" and the switch 302 to the contact "c" whereby the voltage detection circuit 136 detects the terminal voltage in the state of the battery cells 11A and 11B being connected in series with each other.

The control circuit 138 monitors and detects the output of the voltage detection circuit 136 and when the output voltage is found to have reached a predetermined value (for example, this voltage is equal to one that is supposed to be obtained by charging the battery cells 111A and 111B by about 80%), it turns the switch 1530 OFF and the switch 1540 ON and also moves the switch 302 toward the contact "b". Consequently, the battery cell 11A is charged by the output of the cell charging circuit 1520 through the switch 1540, switch 301, battery cell 111A and switch 302 in that order. Further, the terminal voltage of the battery cell 111A is detected by the voltage detection circuit 136 in this case.

Next, the control circuit 138 turns the switch 301 to the contact "b" and the switch 302 to the contact "c" whereby the battery cell 111B is charged through the cell charging circuit 1520, switch 1540, switch 301, battery cell 111B and switch 302 in that order. Further, the terminal voltage of the battery cell 111B in this case is detected by the voltage detection circuit 136.

Thus, the control circuit 138 charges the battery cells 111A and 111B separately in such a manner that the terminal voltages of both of the cells become equal to each other. Consequently, the battery cells 111A and 111B can be charged in a well-balanced manner.

Figure 49:
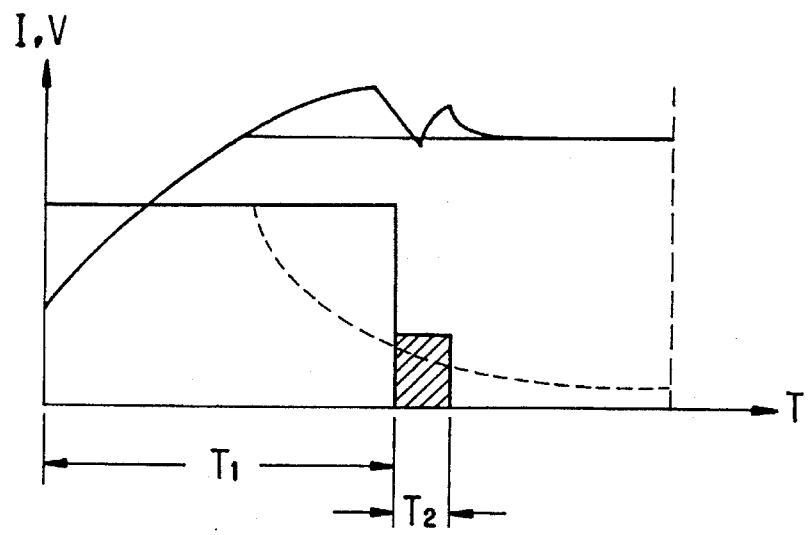
FIG. 49 is a diagram illustrating how the charger of the embodiment of FIG. 48 operates.

FIG. 49 is a graph showing the above-described charging operation. As will be seen from this graph, in the period $T_1$ there is performed a charging operation by the serial battery charging circuit 1510 and in the succeeding period $T_2$ there is performed a charging operation by the cell charging circuit 1520.

Figure 50:
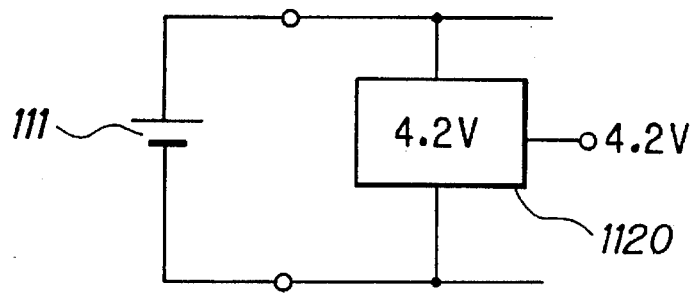
FIG. 50 is a block diagram of a battery terminal voltage detecting circuit for generating a reference voltage.
Figure 51:
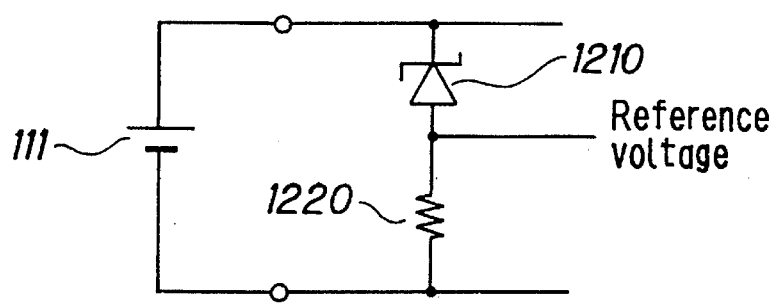
FIG. 51 is a block diagram of a reference voltage generating circuit of FIG. 50.

FIGS. 50 and 51 show examples of circuit structures, respectively, for generating a reference voltage (i.e. an absolute reference voltage for measuring a target voltage) when the voltage of the battery 111 is detected by the voltage detection circuit 136 used in the above-described embodiments. In the example of FIG. 50, a reference voltage of 4.2 V is generated from the reference voltage generating circuit 1120 by making use of the voltage supplied from the battery 111.

The reference voltage generating circuit 1120 is, for example, formed of a series circuit of a zener diode 1210 and a resistor 1220 as shown in FIG. 51. If the breakdown voltage of the zener diode 1220 is set to be a reference voltage to be generated, when the terminal voltage of the battery 111 becomes larger than the breakdown voltage of the zener diode 1210, the zener diode 1210 turns ON to generate the reference voltage.

In the above embodiment, the charging is caused to terminate completely in a predetermined timing but it is also possible to allow a small amount of current to flow through the battery. Alternatively, where the charging time is controlled by the timer, it may be kept constant or may be varied repeatedly.

As described above, according to the present invention, a lead/lithium ion type secondary battery is charged with a constant current and when the charging voltage reaches a predetermined value, the supply of the constant current to the secondary battery is performed intermittently. Consequently, it is possible to charge the secondary battery neither excessively nor insufficiently and in a comparatively short time without breaking the secondary battery.

What is claimed is:

1. A method for charging a secondary battery wherein the secondary battery is charged with a constant current and then additionally charged with a constant voltage equal to a full charging voltage, said method comprising the steps of:

detecting a voltage across said secondary battery while said secondary battery is being charged with said constant current;

starting a timer when said detected voltage is equal to said full charging voltage;

charging said secondary battery with said constant current until a predetermined period of time lapses in the timer from the time when said detected voltage becomes equal to said full charging voltage; and further charging said secondary battery with said constant voltage after a lapse of said predetermined period of time.

2. A method for charging a secondary battery wherein a voltage applied to the secondary battery is controlled by a constant voltage source supplying to the secondary battery a constant voltage equal to a full charging voltage and said secondary battery is charged with a current supplied from a constant current source, said method comprising the steps of:

detecting an amount of decrease in the current supplied to said secondary battery when the voltage applied to said secondary battery is controlled by said constant voltage source;

comparing the detected amount of decrease in the current with a predetermined reference value;

continuing a charging operation when the comparison indicates the detected amount of decrease in the current exceeds the reference value; and charging said secondary battery with said constant current for a predetermined period of time when the comparison indicates the detected amount of decrease in the current is less than the reference value.

3. A charger for performing a charging operation on a secondary battery in such a manner that the secondary battery is first charged with a constant current supplied from a constant current source and then charged with a constant voltage supplied from a constant voltage source equal to a full charging voltage, said charger comprising:

detecting means connected to said secondary battery for detecting a voltage across said secondary battery;

means for determining when the detected voltage is higher than a predetermined reference voltage higher than said full charging voltage: and switching means connected to said detecting means, said current source and said voltage source for switching from a constant current charging operation to a constant voltage charging operation when the voltage detected across said secondary battery by said detecting means is determined to equal said predetermined reference voltage higher than said full charging voltage.

4. A charger for performing a charging operation on a secondary battery in such a manner that the secondary battery is first charged with a constant current supplied from a constant current source and is then charged with a constant voltage supplied from a constant voltage source equal to a full charging voltage, said charger comprising:

detecting means connected to said secondary battery for detecting a voltage across said secondary battery while said secondary battery is being charged with said constant current;

means for determining when the detected voltage is equal to said full charging voltage;

timing means connected to said means for for determining for measuring a predetermined period of time from a time when the voltage detected by said detecting means is determined to be equal to said full charging voltage; and switching means connected to said timing means, said current source and said voltage source for switching the charging operation through said constant current source to the charging operation through said constant voltage source after said predetermined period of time.

5. A method for performing a charging operation on a secondary battery, comprising the steps of:

charging the secondary battery with a constant current;

detecting a charging voltage across said secondary battery;

comparing the detected voltage to first and second predetermined reference values;

supplying said constant current intermittently to said secondary battery when said charging voltage reaches the first predetermined reference voltage; and stopping the charging operation during an interval in which said constant current is not supplied to said secondary battery when said charging voltage becomes equal to the second predetermined reference voltage.

6. A method for performing a charging operation on a secondary battery, comprising the steps of:

charging said secondary battery with a constant current;

detecting a charging voltage across said secondary battery;

supplying said constant current intermittently to said secondary battery when said charging voltage reaches a predetermined reference voltage; and stopping the charging operation after a lapse of a predetermined period of time from the time during an interval in which said constant current is not supplied to said secondary battery when said charging voltage reaches a second predetermined reference voltage.

7. A charger for performing a charging operation on a secondary battery, comprising:

constant current means connected to said secondary battery for charging said secondary battery with a constant current;

constant voltage means connected to said secondary battery for charging said secondary battery with a constant voltage;

detecting means connected to said secondary battery for detecting said charging voltage across said secondary battery;

means for comparing the detected charging voltage with a predetermined value:

switching means connected to said constant current means and said constant voltage means for switching a charging operation with said constant current to a charging operation with said constant voltage after continuing said constant current charging operation for a predetermined period of time from the time when said means for comparing determines said charging voltage reaches the predetermined value; and detecting means connected to said secondary battery for detecting the charging current through said secondary battery at the time of charging with said constant voltage.

* * * * *